(12) United States Patent
Gardner et al.

(10) Patent No.: US 12,486,691 B2
(45) Date of Patent: Dec. 2, 2025

(54) ELECTRIC FENCE REEL

(71) Applicant: DATAMARS SA, Lamone (CH)

(72) Inventors: Amy Diann Gardner, Auckland (NZ); Ashif Iqbal Memon, Auckland (NZ); John Edward Gibson, Auckland (NZ); Myfanwy Jane Antica Norton, Auckland (NZ); Nicholas Paul David Jones, Inglewood (NZ)

(73) Assignee: DATAMARS SA, Lamone (CH)

( * ) Notice: Subject to any disclaimer, the term of this patent is extended or adjusted under 35 U.S.C. 154(b) by 996 days.

(21) Appl. No.: 17/529,552

(22) Filed: Nov. 18, 2021

(65) Prior Publication Data
US 2022/0151198 A1 May 19, 2022

(30) Foreign Application Priority Data
Nov. 19, 2020 (NZ) ........................... 770053

(51) Int. Cl.
*B65H 49/32* (2006.01)
*B65H 59/04* (2006.01)
(Continued)

(52) U.S. Cl.
CPC ......... *E04H 17/266* (2013.01); *B65H 49/327* (2013.01); *B65H 59/043* (2013.01);
(Continued)

(58) Field of Classification Search
CPC ............. B65H 49/32; B65H 2701/364; B65H 75/425; B65H 2402/412; B65H 2402/42;
(Continued)

(56) References Cited

U.S. PATENT DOCUMENTS

| 355,090 | A | * | 12/1886 | Kampf | ................. B65H 75/425 242/403 |
|---|---|---|---|---|---|
| 485,275 | A | | 11/1892 | Hanson | |

(Continued)

FOREIGN PATENT DOCUMENTS

| AU | 2020201281 A1 | 3/2020 |
|---|---|---|
| DE | 10222560 A1 | 12/2002 |

(Continued)

OTHER PUBLICATIONS

Common Sense Manufacturing Inc., "Wire Winders", Mar. 16, 2020, <https://www.commonsensemfg.com/wire-winders>, retrieved from Internet on 14 Jan. 14, 2025.
(Continued)

*Primary Examiner* — Zachary L Kuhfuss
(74) *Attorney, Agent, or Firm* — The Webb Law Firm

(57) ABSTRACT

Provided is a reel for a conductor of an electric fence. The reel includes a bobbin, a frame for supporting the bobbin, and a connector. The connector can be two jaws and can have passages to connect the reel to a support such as a conductor of an existing fence or a tube of a vehicle. One of the jaws can be wide for stability. The connector can have an electrical conductor for connecting to the support and electrifying the conductor. The connector can also be operated by a trigger and can have a locking mechanism. The frame can be a one-piece frame made of plastics material. The reel can have a spreader and a hot-up bar. The reel can have a crank that can be disengaged from the bobbin and a brake that is applied when the crank is disengaged.

18 Claims, 18 Drawing Sheets

(51) Int. Cl.
*B65H 75/44* (2006.01)
*B65H 75/48* (2006.01)
*E04H 17/04* (2006.01)
*E04H 17/26* (2006.01)
*H01B 17/14* (2006.01)
*H02G 11/02* (2006.01)

(52) U.S. Cl.
CPC ....... *B65H 75/441* (2013.01); *B65H 75/4442* (2013.01); *B65H 75/446* (2013.01); *B65H 75/4494* (2013.01); *B65H 75/486* (2013.01); *E04H 17/04* (2013.01); *H01B 17/145* (2013.01); *H02G 11/02* (2013.01); *B65H 2408/234* (2013.01); *B65H 2701/364* (2013.01)

(58) Field of Classification Search
CPC ............. B65H 2402/30; B65H 75/446; B65H 49/327; B65H 49/20; B65H 59/04; B65H 59/043; B65H 75/441; B65H 75/4442; B65H 75/4494; B65H 75/486; E04H 17/266; E04H 17/017; E04H 17/04; A01K 3/005; H02G 11/02; H01B 17/145
USPC ...... 242/403, 395, 396.4, 557, 404.2, 423.1, 242/419.4; 256/10
See application file for complete search history.

(56) References Cited

U.S. PATENT DOCUMENTS

| | | | |
|---|---|---|---|
| 2,204,125 A | 6/1940 | Dayton | |
| 2,214,315 A * | 9/1940 | Adamson | B65H 59/04 242/604 |
| 2,338,126 A | 1/1944 | Maynes | |
| 3,148,261 A * | 9/1964 | Schlenz | H02G 11/02 200/545 |
| 4,190,211 A * | 2/1980 | Janzen | B65H 49/32 242/599.3 |
| 6,016,986 A | 1/2000 | Wright | |
| 6,942,172 B2 | 9/2005 | Thomas | |
| 2003/0222253 A1 | 12/2003 | Langlie et al. | |
| 2005/0087645 A1* | 4/2005 | Tracey | B65H 75/4492 242/395 |
| 2010/0301297 A1 | 12/2010 | Chapman | |
| 2014/0048758 A1 | 2/2014 | Oland | |
| 2014/0262616 A1 | 9/2014 | Cullum | |

FOREIGN PATENT DOCUMENTS

| | | |
|---|---|---|
| EP | 0127422 A2 | 12/1984 |
| GB | 749206 A | 5/1956 |

OTHER PUBLICATIONS

Guenther, Lisa, "Rolling up old fence wire simplified", Grainnews, May 20, 2015, <https://www.grainews.ca/cattlemanscorner/rolling-up-old-fence-wire-simplified/>, retrieved from Internet on Jan. 14, 2025.

* cited by examiner

ELECTRIC FENCE REEL

CROSS-REFERENCE TO RELATED APPLICATION

This application claims priority to New Zealand Provisional Patent Application No. 770053 filed Nov. 19, 2020, the disclosure of which is hereby incorporated by reference in its entirety.

BACKGROUND OF THE INVENTION

Field of the Invention

This invention relates to an electric fence reel.

Description of Related Art

In electric fences, a length of conductor is electrified to shock an animal that contacts the conductor. In a farming situation, for example, an electric fence can form the boundary of a paddock, holding area or other region in which animals are to be kept.

Lengths of conductor, such as polymer twine, rope, braided cord or tape with embedded wires, can be held on reels. The reels can also be used to pay out and wind up the conductor. The reels may be used to erect temporary fences and may be connected to existing electric fences.

SUMMARY OF THE INVENTION

According to one example there is provided a reel for a conductor of an electric fence, the reel including:
a bobbin;
a frame for supporting the bobbin; and
a connector coupled to the frame for connecting the reel to a support, the connector including two jaws configured for relative movement between open and closed configurations.

According to another example there is provided a reel for a conductor of an electric fence, the reel including:
a bobbin;
a crank for rotating the bobbin, the crank being selectively disengageable from the bobbin; and
a brake for restricting rotation of the bobbin when applied;
wherein the brake is configured to be applied upon disengagement of the crank.

According to another example there is provided a reel for a conductor of an electric fence, the reel including:
a bobbin;
a guide configured to guide a length of the conductor that extends from the bobbin;
an electrical contact for connecting to an electric power supply; and
a bar galvanically connectable to the electrical contact and positioned between the bobbin and the guide such that the length of conductor can engage the bar to electrify the conductor.

According to another example there is provided a reel for a conductor of an electric fence, the reel including:
a bobbin; and
a spreader configured to move the conductor across the bobbin as the bobbin rotates to control distribution of the conductor on the bobbin.

According to another example there is provided a reel for a conductor of an electric fence, the reel including:
a bobbin;
a connector for connecting the reel to a conductor of an existing electric fence to support the reel in use; and
a plastics material frame coupled to the bobbin and the connector, the frame surrounding the bobbin.

According to another example there is provided a reel for a conductor of an electric fence, the reel including:
a bobbin;
a connector for connecting the reel to a conductor of an existing electric fence to support the reel in use; and
a one-piece frame coupled to the bobbin and the connector, the frame surrounding the bobbin.

According to another example, there is provided a reel of a conductor of an electric fence, the reel including:
a bobbin;
a hot-up contact configured to contact the conductor to electrify the conductor; and
a connector for connecting the reel to a support, the connector having an electrical contact thereon for making electrical contact with the support;
wherein the electrical contact of the connector is electrically connected to the hot-up contact to electrify the connector when the reel is connected to the support.

According to another example there is provided reel for a conductor of an electric fence, the reel including:
a bobbin;
a frame for supporting the bobbin; and
a connector for connecting the reel to another object, the connector including a trigger for moving the connector between open and closed configurations.

According to another example there is provided a reel for a conductor of an electric fence, the reel including:
a bobbin;
a frame for supporting the bobbin;
a connector for connecting the reel to another object, the connector including two jaws configured for relative movement between open and closed configurations; and
a locking mechanism for selectively preventing the jaws being forced open.

According to another example there is provided a reel for a conductor of an electric fence, the reel including:
a bobbin;
a frame for supporting the bobbin; and
a connector for connecting the reel to another object, the connector including two jaws configured for relative movement between open and closed configurations;
wherein the two jaws define two passages therebetween, each passage configured to receive an object to be connected to.

According to another example there is provided a reel for a conductor of an electric fence, the reel including:
a bobbin;
a frame for supporting the bobbin; and
a connector for connecting the reel to another object, the connector including two jaws configured for relative movement between open and closed configurations;
wherein at least one of the jaws has a wide contact region for contacting the object at widely separated points along the object.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification illustrate embodiments of the invention and, together with the general description of the invention given above and the detailed description of embodiments given below, serve to explain the principles of the invention.

DESCRIPTION OF THE INVENTION

Figure 1:
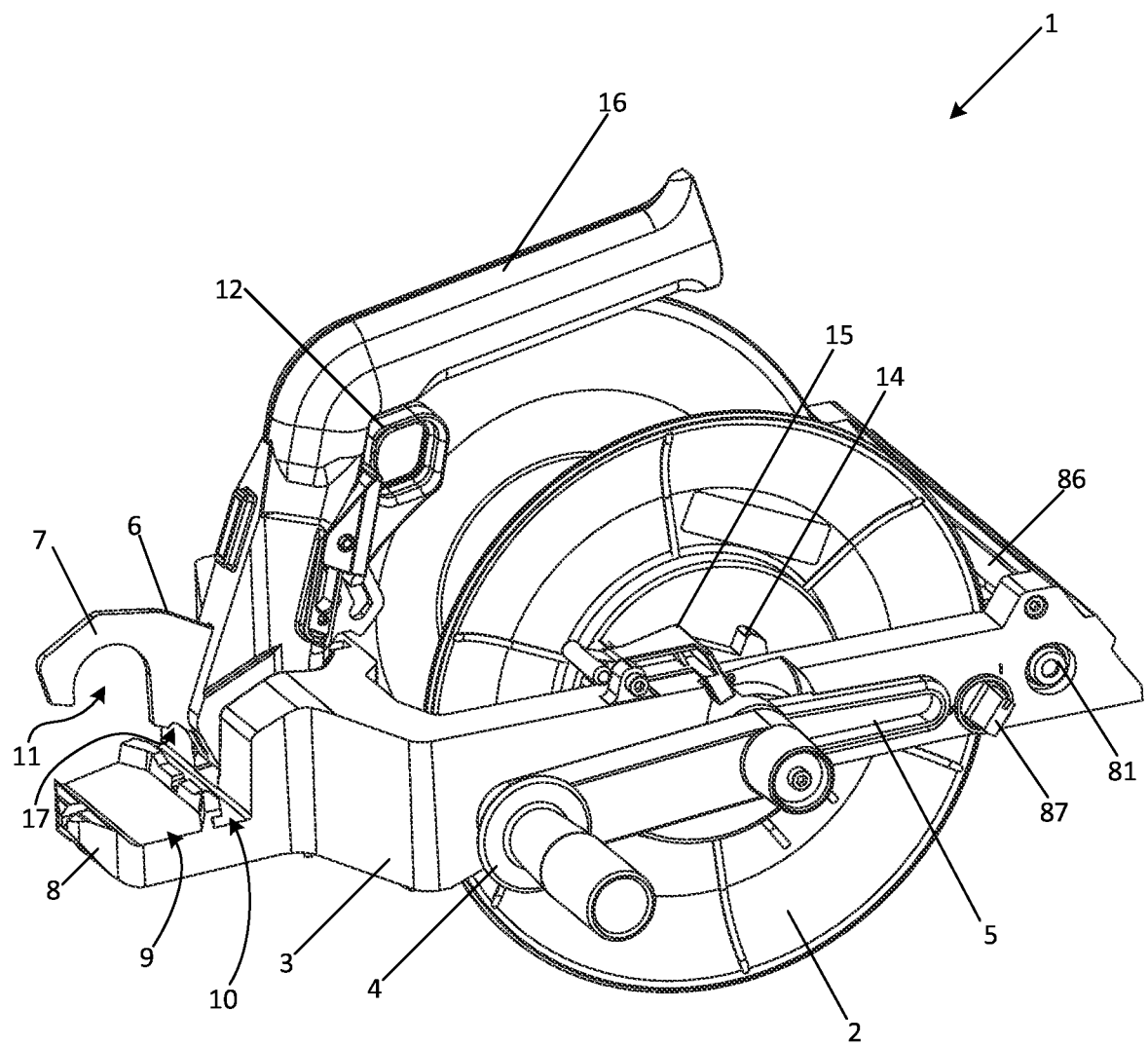
FIG. 1 is a perspective view of a reel in accordance with one example.

FIG. 1 illustrates a reel 1 according to an example. The reel includes a bobbin 2 for holding a conductor wound on the bobbin 2. The bobbin can be rotated using crank 4 to wind up or tension the conductor. The bobbin and crank are supported by frame 3. The conductor can be twine, rope, braided cord, or tape constructed from thermoplastic polymer filaments, with electrically conductive metallic filaments intertwined, interwoven or otherwise entwined lengthwise along the twine, rope, braided cord, or tape.

The frame 3 in this example surrounds the bobbin 2. It is a closed loop around the bobbin, in particular it extends across the front of the bobbin. This may improve the strength and rigidity of frame 3 compared to "C-shaped" frames that do not surround the bobbin and are open at the front. Having the frame 3 surrounding the bobbin 2, including across the front, also facilitates the use of a spreader at the front of the reel 1. Having the frame 3 surrounding the bobbin 2, including across the rear, also facilitates the use of a connector 6 at the rear of the reel 1.

The frame 3 in this example is made of plastics material. This means that the frame 3 is entirely or substantially plastics material in composition. While the frame 3 could have attachments or accessory parts such as labels, screws, wires, or switches in or on it, the frame 3 would still be substantially plastics material in composition.

The plastics material frame may reduce the risk of a user receiving a shock from the reel 1 due to the non-conductive nature of plastics materials. It may also allow the frame 3 to be manufactured relatively inexpensively and simply. For example, the frame 3 could be moulded. Alternatively, the frame 3 could be made using other techniques such as 3D printing.

The frame 3 in this example is a one-piece frame. This may simplify manufacture of the frame 3 and construction of the reel 1. It may also improve the strength of the frame 3 by avoiding the need for connections between frame pieces which may make it less prone to failure. The frame 1 could be moulded in one piece, for example from plastics material.

The crank 4 in this example is selectively rotationally disengageable from the bobbin 2. This means that, when disengaged, the bobbin 2 can rotate without causing the crank 4 to rotate. This may be particularly useful when paying out the conductor. The bobbin 2 can rotate at relatively high speed when the conductor is being paid out, and if the crank 4 were engaged with it to also rotate, the crank 4 could hit the user or another object. This could potentially cause injury to the user or damage to the reel or the other object. Also, the off-axis mass of the crank may cause the reel to wobble or vibrate if the crank were to rotate during paying out. A rotating crank may also add aerodynamic drag and increase friction, reducing the speed of rotation of the bobbin, and increase the moment of inertia of the rotating parts, decreasing the acceleration and deceleration of the bobbin. Disengaging the crank 4 from the bobbin 2 during paying out may prevent or reduce these issues.

In the example of FIG. 1, the reel 1 includes a disengagement lever 5 between the crank 4 and the bobbin 2. The disengagement lever 5 can be used to disengage the crank 4 from the bobbin 2, as will be described in more detail below with reference to FIGS. 5 and 6.

The reel 1 of FIG. 1 has a spreader shaft 81 at the front of the reel 1, which forms part of a spreader as detailed with reference to FIG. 8. The spreader is provided to control the winding of the conductor on the bobbin by guiding the conductor while moving back and forth across the bobbin as the bobbin 2 rotates. This may ensure even distribution of the conductor on the bobbin 2 and may minimise tangling of the conductor. The reel 1 also includes a hot-up contact for electrifying the conductor. In this example, the hot-up contact is bar 86. Other hot-up contacts could be provided, for example an exposed wire can run across the spindle of the bobbin 2, where it will make contact with the conductor wound on the bobbin 2.

The reel 1 of FIG. 1 is provided with a handle 16 for carrying the reel 1.

The reel 1 of FIG. 1 also includes a connector 6 for connecting the reel 1 to a support. The connector 6 in this example includes jaws 7 and 8. As shown in FIG. 1, the jaws 7, 8 are in an open configuration. In this configuration, the jaws 7, 8 can be placed over the support or removed from the support. The jaws 7, 8 can move relative to each other between this open configuration and the closed configuration (shown in FIGS. 2 and 3). In this example, the jaw 8 is fixed and the jaw 7 is movable. In alternative examples, both jaws 7, 8 can be movable.

The jaws 7, 8 can be operated by a manual control element to open and close them. In this example, relative movement of the jaws 7, 8 is driven by the trigger 12. The trigger 12 is coupled to the jaw 7 for driving the jaw's movement. Alternatively, the trigger 12 could be coupled to both jaws 7, 8 to drive movement of one or both of the jaws 7, 8. The trigger 12 is positioned to be operated by a user while holding the handle 16. For example, the user may operate the trigger 12 with their index finger while holding the handle 16 with their other fingers. In this example, the user can pull the trigger 12 to open the jaws 7, 8 and push or release the trigger 12 to close the jaws 7, 8.

The jaw 8 is relatively wide to provide a wide region for contacting a support at widely separated points. This may improve the stability of the reel 1 when connected to a support by reducing side-to-side rocking. The wide region can be at least 50 mm wide, at least 80 mm wide, or about 110 mm wide. In one example the other jaw 7 could be wide to provide a wide contact region, instead of or in addition to the jaw 8 being wide.

Figure 2:
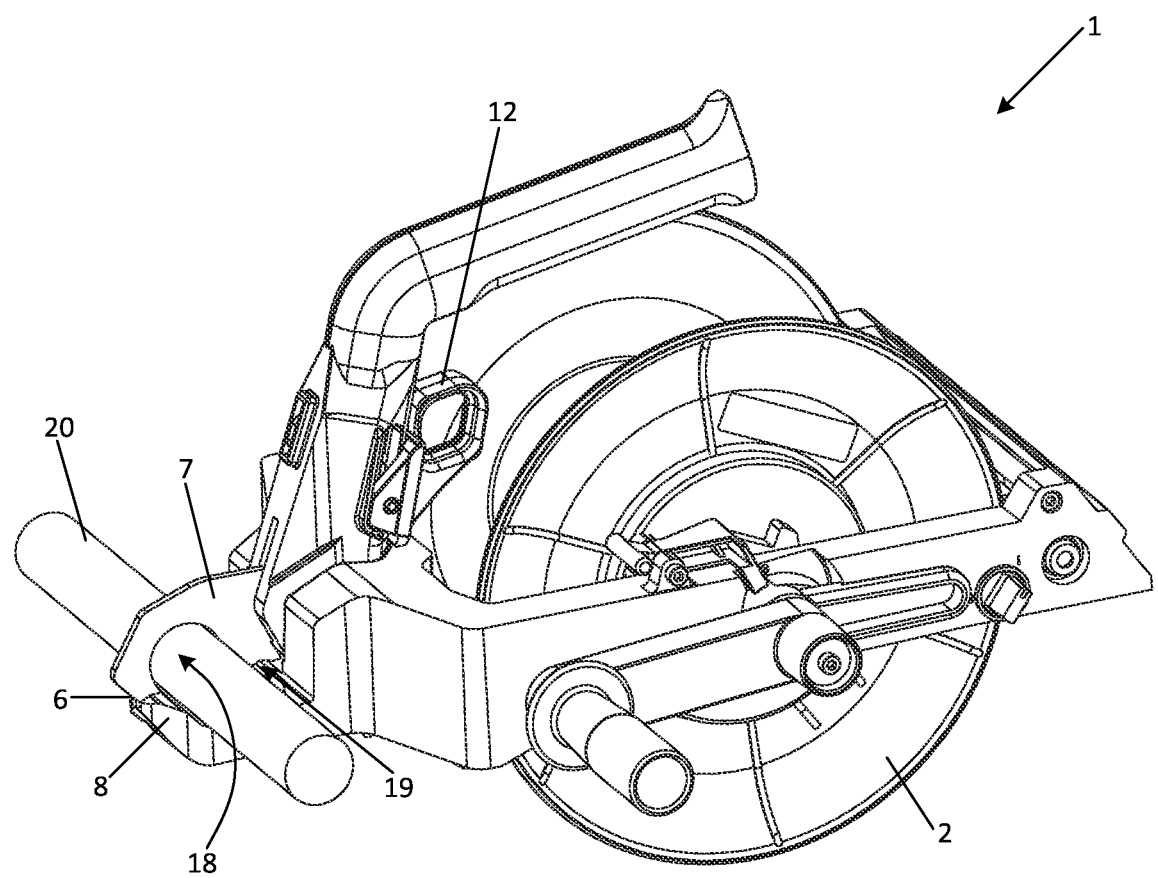
FIG. 2 is a perspective view of the reel of FIG. 1 connected to a tube.
Figure 3:
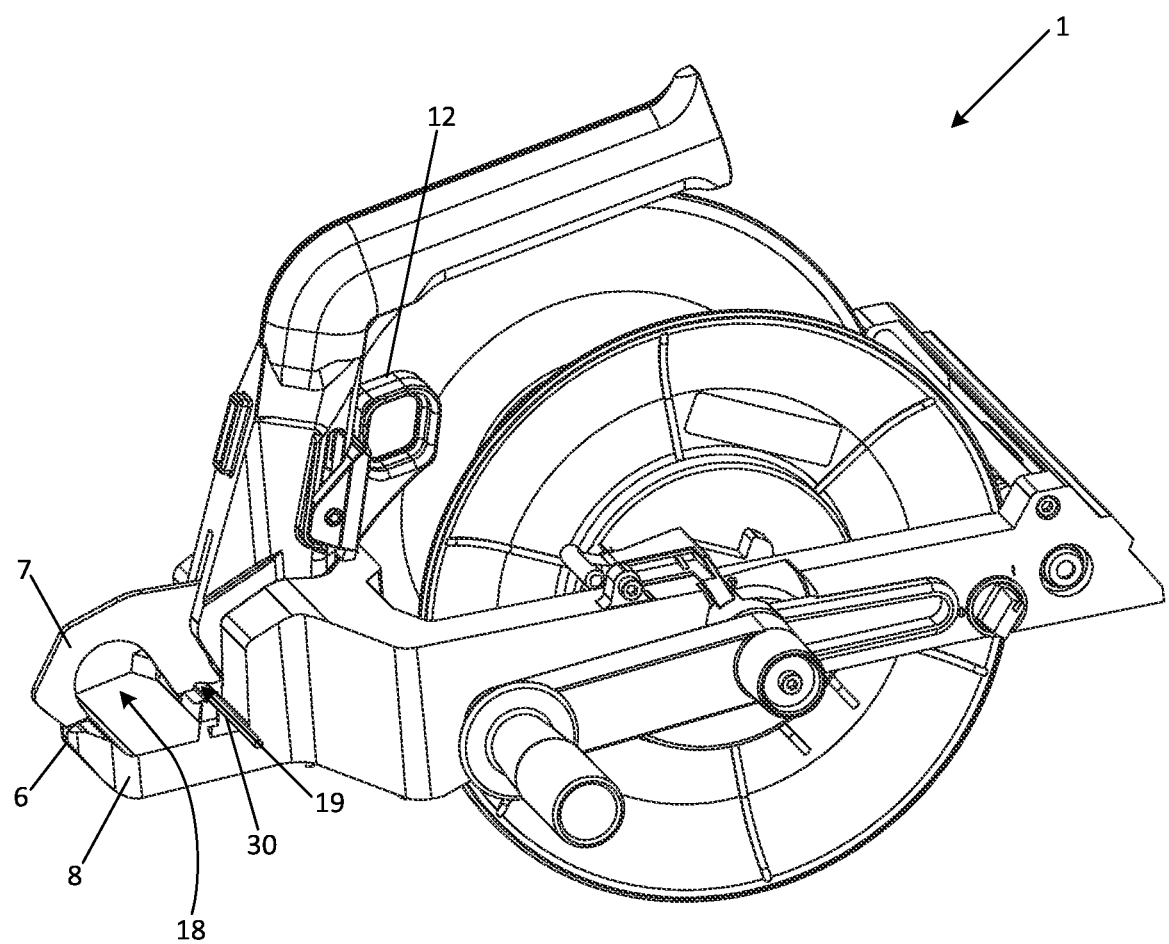
FIG. 3 is a perspective view of the reel of FIG. 1 connected to a wire.

The jaws 7 and 8 can define passages for connecting to different items. In this example, one passage is defined between the recessed portion 11 of jaw 7 and the recessed portion 9 of the jaw 8. Due to the large recess 11 in this example, the jaw 7 is generally in the form of a hook. Another passage is defined between the portion 17 of the jaw 7 and the recessed portion 10 of the jaw 8. FIGS. 2 and 3 show the passages 18 and 19. The passages 18 and 19 are different sizes from each other. This may allow the connector 6 to make good, stable connections to supports of different sizes, such as a conductor of an existing electric fence and a tube of a vehicle structure. The passage 19 can be sized to receive a conductor of an electric fence, for example it can be sized to receive a circular cross-section conductor with a diameter between approximately 1.6 mm and 4 mm. The passage 19 can be sized to receive a circular cross-section conductor of less than approximately 15 mm in diameter, less than approximately 10 mm in diameter, or about 4 mm in diameter. The passage 19 can have a width between the jaws of less than approximately 15 mm, less than approximately 10 mm, or about 4 mm. The passage 18 can be sized to receive a tube of a vehicle, for example it can be sized to receive a tube with a diameter between about 18 mm and about 36 mm. The passage 18 can accommodate a diameter greater than that of the passage 19. The passage can be sized to receive a circular cross-section support member of greater than approximately 15 mm in diameter, greater than approximately 20 mm in diameter, or about 36 mm in diameter. The passage 18 can have a width between the jaws greater than that of the passage 19. The passage 18 can have a width between the jaws greater than approximately 15 mm, greater than approximately 20 mm, or about 36 mm.

The portion(s) of one or both of the jaws that form the passage 19 can be electrically conductive to connect the reel to a conductor in the passage 19. In this case, one or both conductive jaw(s) can be an electrical contact for connecting to an energiser, directly or via another element such as a conductor of an existing electric fence. This can be used for electrifying the conductor on the reel via a hot-up contact such as bar 86. This can be done by making one or both of the jaws from metal at least in the region around the passage 19. In the example of FIG. 1, the jaw 7 is metal and provides galvanic connection to bar 86.

The reel can also include a switch 87 for electrically disconnecting the jaw 7 from the hot-up bar 86. This may allow a user to connect the reel 1 to a wire on one fence and connect the far end of the conductor to another fence via an electrically insulating connection means such as an electric fencing 'handle', for example when the fences are not electrified and the user only wants to electrify the conductor of the reel using a portable energiser. It may also allow the user to connect the end of the conductor to an energised fence and connect the reel to a farm bike to reel it out without causing the bike to become electrified, especially if the passage 18 is not galvanically isolated from the conductor of the reel or if a metal part of the jaw 7 makes contact with a metal part of the farm bike.

The portions of the jaws 7, 8 that form the passage 18 can also be galvanically isolated from the conductive portions of the jaws around the passage 19. This means that if an electrified conductor is in the passage 19 then the hot-up bar 86 can be electrified, whereas an object (for example a carrier of a farm bike) in the passage 18 will not be electrified if the end of the conductor is electrically connected to an energised fence and the reel is attached to a farm bike to reel it out. This can be done by making parts of the jaws around the passage 18 from non-conductive materials or adding non-conductive piece(s) to the jaws.

The connector 6 can include a locking mechanism for locking into the closed configuration. This prevents the jaws 7, 8 from being opened by directly pushing them apart. They would then only be openable using a control element such as the trigger. The connector 6 can also include a mechanism for locking into the open configuration. This could be the same mechanism that locks the connector in the closed configuration or a different one.

In FIG. 2, the reel 1 is shown connected to a tube 20. This could be, for example, a piece of tubing of a carrier or frame on the back of a farm bike. The jaws 7 and 8 are closed over the tube 20 with the tube 20 occupying the passage 18.

In FIG. 3, the reel 1 is shown connected to a wire 30. This could be, for example a conductor of an electric fence. The jaws 7, 8 are closed with the wire 30 occupying the passage 19.

Figure 4:
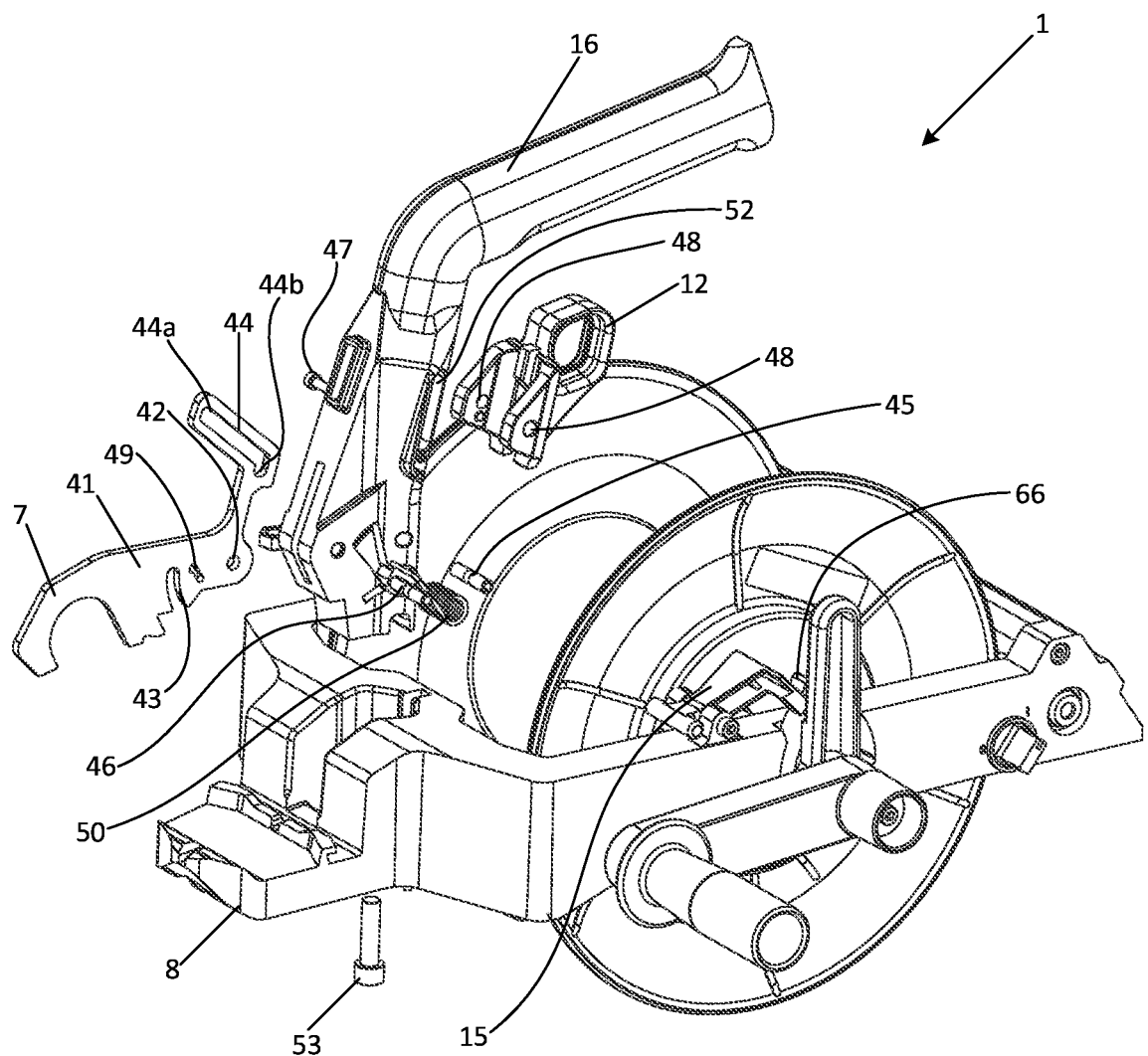
FIG. 4 is a partly exploded view of the reel of FIG. 1.

In the partly exploded view of FIG. 4, the exemplary connector and related parts are shown in detail. The jaw 7 is shown coupled to the member 41. In this example, the jaw 7 and member 41 are integrally formed from a single piece of metal, but they could be made from two separate but mechanically coupled pieces. The member 41 has a pivot hole 42 formed in it that receives pivot pin 45 to allow the jaws 7, 8 to pivot. The pivot pin 45 in this example extends through the base of the handle 16.

The member 41 in this example includes a guide slot 44 that receives a guide pin 47. The guide slot 44 in this example is in two sections 44a and 44b. The guide pin 47 is slidably mounted in the reel 1 to move relative to the member 41. In particular, the guide pin 47 is screwed into holes 48 in the trigger 12 and extends through slot 52 in the handle 16. As the guide pin 47 moves along the guide slot 44, it drives movement of the member 41 and hence of the jaw 7. The section 44a of the guide slot 44 is at an angle to the path of movement of the guide pin 47 through slot 52 so that when the guide pin 47 moves towards the open position (generally upwards, but slightly tilted to the right in the orientation shown in FIG. 4) it pushes on the side of the guide slot 44 causing pivoting of the member 41 around the pivot pin 45.

When the jaw 7 is in the closed position, the guide pin 47 is initially in the section 44b. In this configuration, the guide pin and section 44b prevent pivoting of the member 41 because the guide pin 47 interact with the side of the guide slot section 44b under attempted pivoting.

When the guide pin 47 is moved out of the section 44b into the section 44a, it allows pivoting of the member 41. In this example, when the trigger 12 is pulled to move along slot 52 the guide pin 47 initially moves out of the section 44b to allow pivoting of the member. The guide pin then moves along the section 44a as it slides "upwards", driving pivoting of the member 41.

Figure 18:
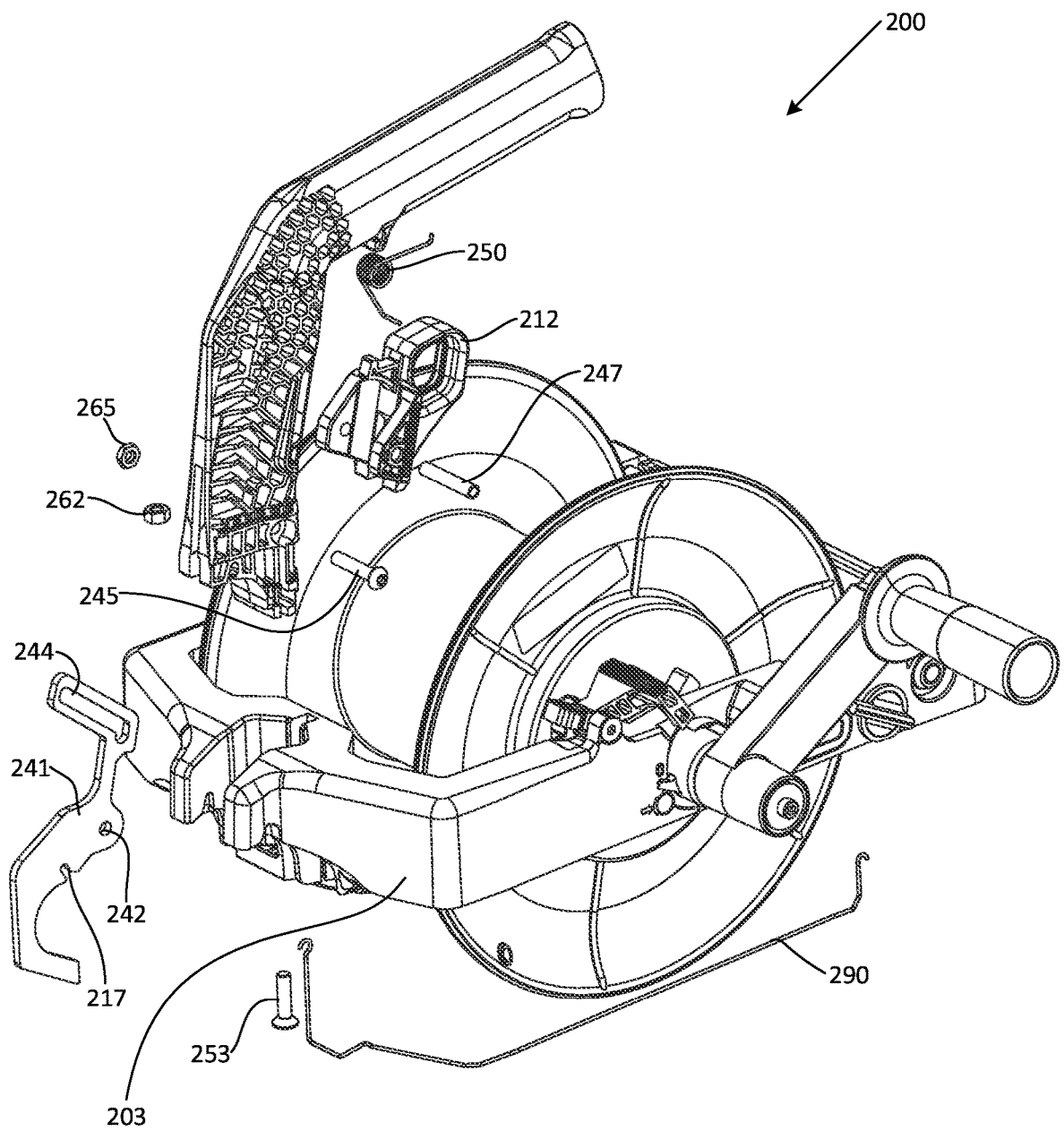
FIG. 18 is a partly exploded view of the reel of FIG. 15.

The member in this example also has a second guide slot 43 formed in it that receives a second guide pin 46. The guide pin 46 in this example extends from the base of the handle 16, but it could alternatively extend from the frame. This provides additional guidance to the member 41. Alternatively, the second guide pin 46 and second guide slot may be omitted, as shown in the example of FIG. 18.

In an alternative example, the guide slot 43 can have two sections—one through which the guide pin 46 can move freely when the member pivots to allow pivoting of the member and another that interacts with the guide pin 46 to prevent pivoting. In this example, the guide slot 44 may not need the section 44b, although it could be included to provide a second point of locking. In this example, the pivot hole 42 can be elongate to allow the member 41 to translate such the guide pin 46 is initially moved out of the section of the guide slot that prevents pivoting into the section that allows pivoting.

In another alternative, a locking pin could be provided to extend through a locking hole in the member 41. To permit opening of the jaws, the locking pin could be first withdrawn from the locking hole. The locking pin could be spring loaded, such that when jaw 7 is in the closed position and the locking pin aligns with the locking hole, the pin is pushed through the hole by the spring. The spring-loaded locking pin could then be first withdrawn from the locking hole and the member 41 pivoted away from the closed position of the jaws 7, 8 to the open position using the trigger 12.

The member 41 also includes a small slot 49 for receiving a leg of the torsion spring 50. The torsion spring 50 biases the member, and hence the jaw 7, towards the closed position. The torsion spring can also be galvanically connected to the bolt 53. This bolt 53 can be used to connect the jaw 7, via the spring 50 and bolt 53, to a hot-up wire as detailed later with reference to FIGS. 8 and 9. The bolt 53 also connects the handle 16 to the frame 3.

Figure 5:
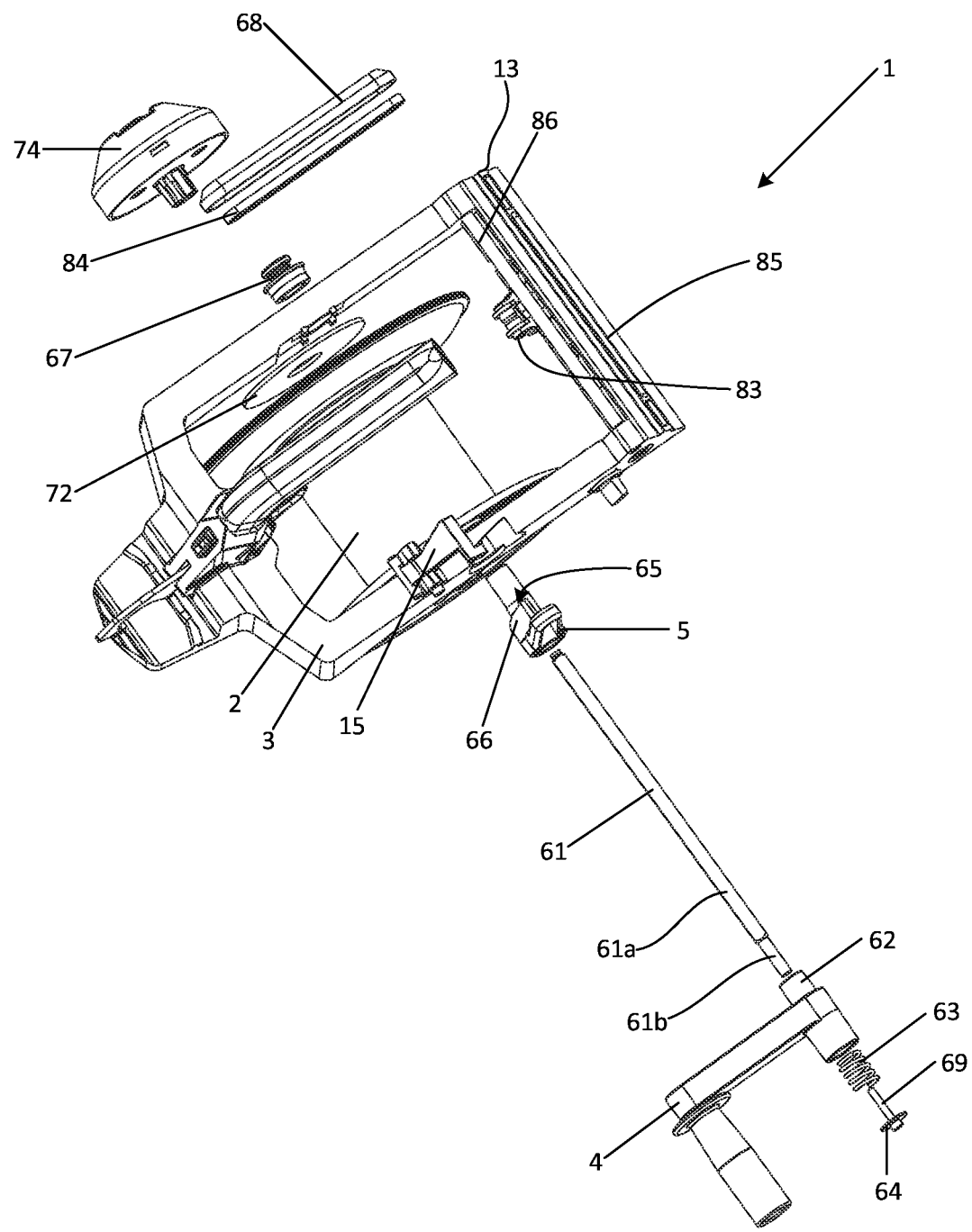
FIG. 5 is another partly exploded view of the reel of FIG. 1.

FIG. 5 is a partly exploded view of the reel 1 showing the driveline of the reel 1. As can be seen, the crank 4 includes a socket 62 that can couple to a crank shaft 61. The crank shaft 61 drives the bobbin 2, allowing the crank 4 to drive its rotation. In this example, the crank shaft 61 drives the bobbin 2 via transmission 74. The crank shaft 61 is in two sections, 61a and 61b. Section 61a has a non-circular cross section that can be engaged with the socket 62, which has recess with a corresponding non-circular cross section, to transmit rotation between the crank 4 and the crank shaft 61 when engaged. In this example, the section 61a of the crank shaft 61 has a square cross section and the recess of the socket 62 is also square, but other non-circular shapes can be used.

The reel 1 can also have a guide for guiding the length of the conductor that is unwound from the bobbin. The guide in this example is a slot 85 formed in the frame 3 at the front of the reel. The conductor can pass through the slot to control the position at which the conductor leaves the reel. This may ensure that the conductor passes over and engages with the bar 86. Alternatively, other guides such as rollers could be used.

The crank shaft 61 in this example is also connected to pulley 67, which is used to drive the spreader shaft 81 via a belt 84, which has a belt cover 68. Provided with the spreader is a bar 86 for electrifying the conductor.

The section 61b of the shaft 61 does not engage with the socket 62 in a rotation-transmitting way. It can be smaller than the recess and/or circular in cross section. In this example, the section 61b is circular with a diameter slightly less than the smallest cross-sectional dimension of the section 61a. This means that when the section 61b, without section 61a, is in the recess of the socket the crank 4 and crank shaft 61 rotate freely with respect to each other.

To disengage the crank 4 from the bobbin 61, the crank 4 is moved with respect to the crank shaft 61 so that the section 61a of the crank shaft 61 is moved out of the socket 62 and only the section 61b remains in the socket 62. A disengagement lever 5 can be used to move the crank 4 into the disengaged position. In this example, disengagement lever 5 includes a cam surface 65 that engages with a corresponding cam surface of a disengagement bushing (see 73 in FIG. 6) in the frame 3. Rotation of the disengagement lever 5 causes the lever 5 to move away from, and towards the frame 3, thereby driving the crank 4 into the disengaged and engaged positions.

Figure 10:
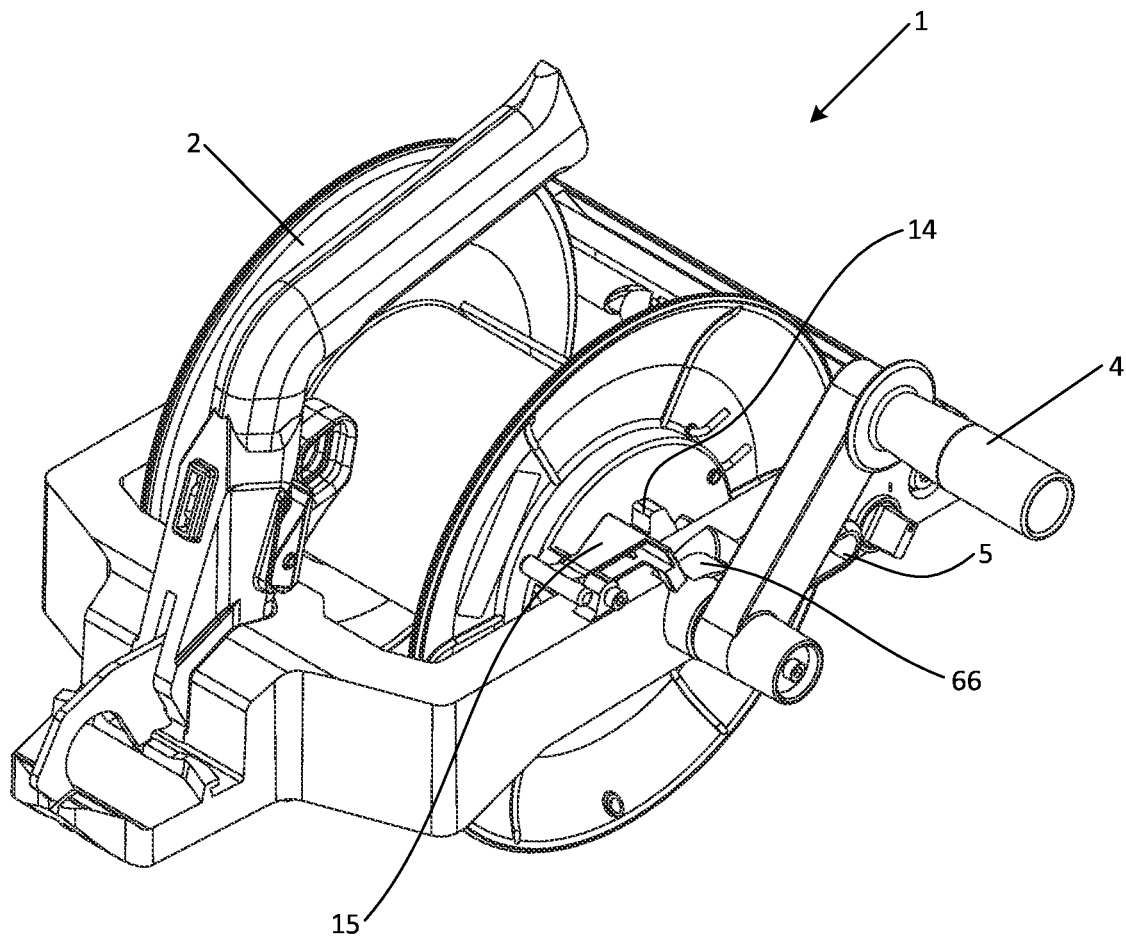
FIG. 10 is a perspective view of the reel of FIG. 1 in one state.
Figure 11:
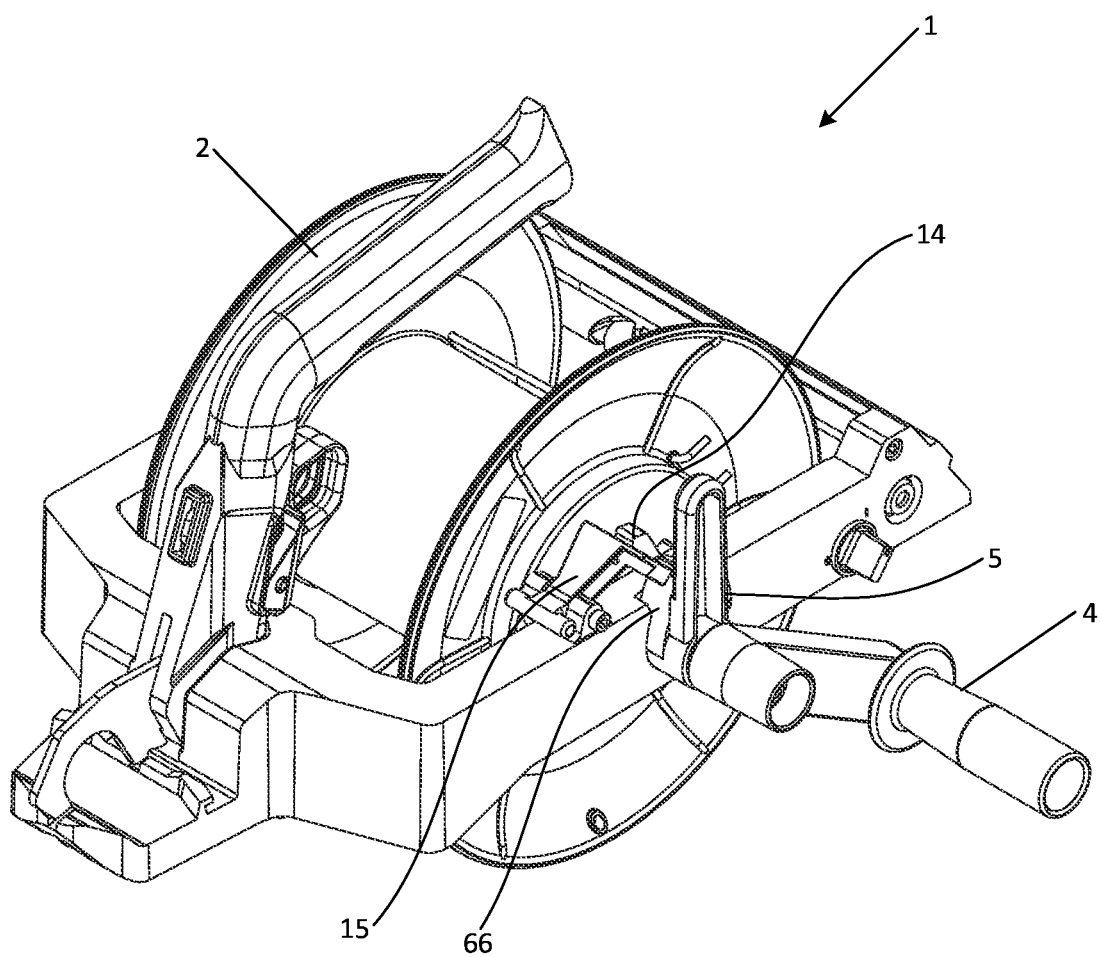
FIG. 11 is a perspective view of the reel of FIG. 1 in another state.

The disengagement lever 5 in this example also has a cam lobe 66 that is used to disengage the pawl 15 from ratchet 14. When the disengagement lever 5 is in the engaged position, the cam lobe 66 allows the pawl 15 to engage with the ratchet 14 to prevent rotation of the bobbin 2 in one direction (e.g. the "paying out" direction). This state is shown in FIG. 10. This allows the user to reel or tension the conductor without it unrolling from the bobbin 2. When the disengagement lever 5 is in the disengaged position, the pawl 15 is moved away from the ratchet 14 and disengaged from it. This state is shown in FIG. 11. This allows the conductor to be paid out by tension applied to the conductor, for example by carrying the reel 1 away from an electric fence to which the end of the conductor is attached.

In an alternative example, the pawl 15 can include a projection that projects laterally out from the frame 3. When the disengagement lever 5 is rotated to the disengaged position, it contacts the projection and continues rotating, pushing on the projection and rotating the pawl 15 to the disengaged position. In this example, the disengagement lever 5 can include a recess for engaging with the projection.

The crank 4 is connected to the crank shaft 61 by bolt 69. A spring 63 is provided between the crank 4 and a washer 64 at the end of the bolt 69. This biases the crank shaft 61 towards the crank 4. Alternatively, other resilient means such as a rubber bushing could be used in place of the spring.

Figure 6:
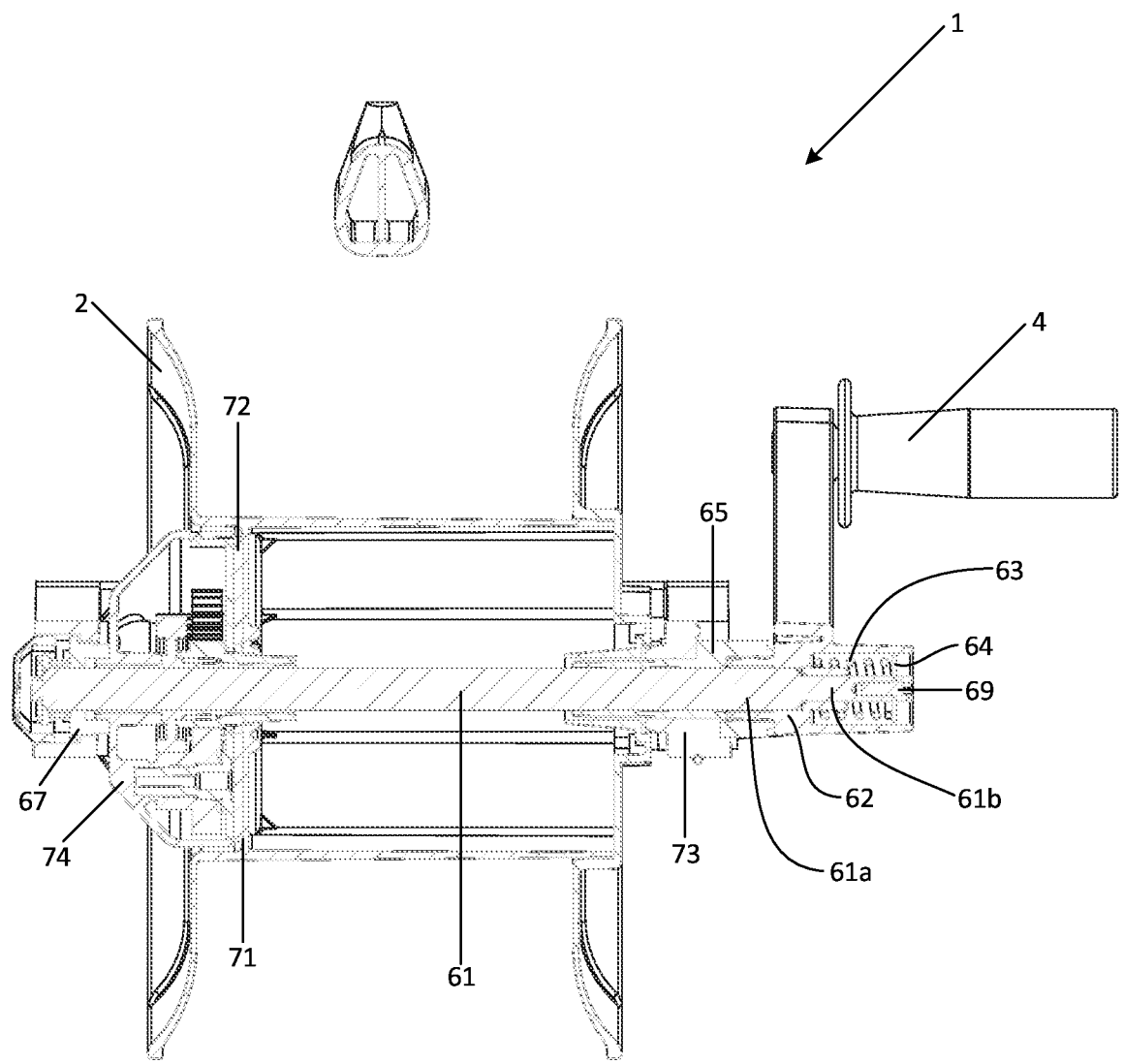
FIG. 6 is a cross-sectional view of the reel of FIG. 1 in one state.
Figure 7:
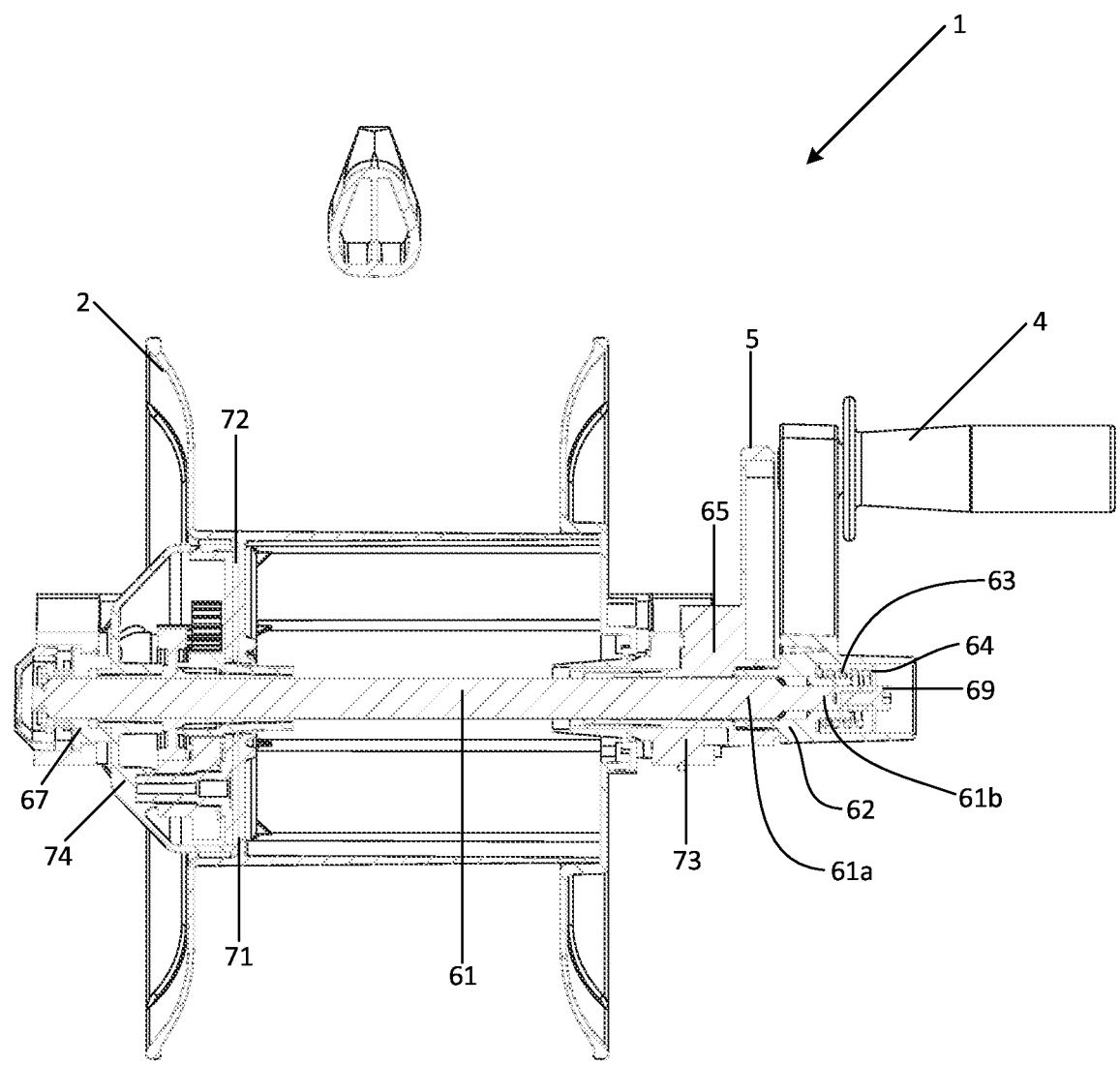
FIG. 7 is another cross-section view of the reel of FIG. 1 in another state.

As shown in FIGS. 6 and 7, the shaft 61 is also coupled to a brake 71. Axial force to the right in the crank shaft 61 is transmitted to the brake 71 via the bearing or bush within which the shaft 61 is engaged in the transmission 74 and thereby via the housing of the transmission 74. When the recess of the socket 62 of the crank 4 is on the section 61a of the shaft 61 in the engaged position, the spring 63 is relatively uncompressed. The brake 71 is then either not applied to the bobbin 2 or only applied to a relatively low degree. This state is shown in FIG. 6. When the crank 4 moves off the section 61a of the crank shaft to the disengaged position (to the right in FIGS. 6 and 7) over section 61b only, the spring 63 is compressed. That increases the force on the shaft 61 and causes the brake 71 to be applied to the bobbin 2 or applied to a greater degree. This state is shown in FIG. 7.

The brake in this example includes a braking element 72 that is pressed against the bobbin by the shaft to restrict the bobbin's rotation. In this example, the braking element is a friction washer. The friction washer can be made at least partly of a natural fibre, for example wool. Natural fibres may be particularly well suited to this application. The friction washer can also include another material—natural, synthetic or composite/semi-synthetic—mixed with the natural fibre. One suitable such material is viscose. A mix of 70% wool and 30% viscose has been found to provide suitable braking while being resistant to the frictional heating effects incurred in use without melting or burning. Other suitable materials that could be used alone or in any suitable combination, are acrylic felt, wool/composite sheet, and EVA (ethylene-vinyl acetate) foams. The brake can be used to prevent over-running of the bobbin 2 and paying out of excessive amounts of conductor. For example, if a farm bike is used to carry the reel 1 away from a fence to which the end of the conductor is attached, this can cause quite fast bobbin rotation. When the bike stops, the bobbin 2 could continue spinning for a long time and unreel a lot of conductor, which can become tangled and require time-consuming rewinding. With the brake 71 applied, the bobbin may come to a relatively quick stop, avoiding the unwinding of so much conductor.

In an alternative example, the brake can be engaged automatically as the bobbin is rotated in the "backwards" direction to unwind the conductor. An example of this is described in detail with reference to FIGS. 13 and 14.

Also shown in FIGS. 6 and 7 is a transmission 74. This is used to increase the rotational speed of the bobbin relative to the crank, i.e. with a crank-to-bobbin rotation speed ratio of less than 1:1. The ratio of crank rotation speed to bobbin rotation speed can be less than 2:3. In this example, the transmission has a 1:3 ratio of crank rotation speed to bobbin rotation speed. Various forms of transmission, with various ratios, could be used. Alternatively, the crank 4 could drive the bobbin 2 directly, without using a transmission to increase the rotational speed of the bobbin 2—i.e. with a 1:1 ratio.

Figure 8:
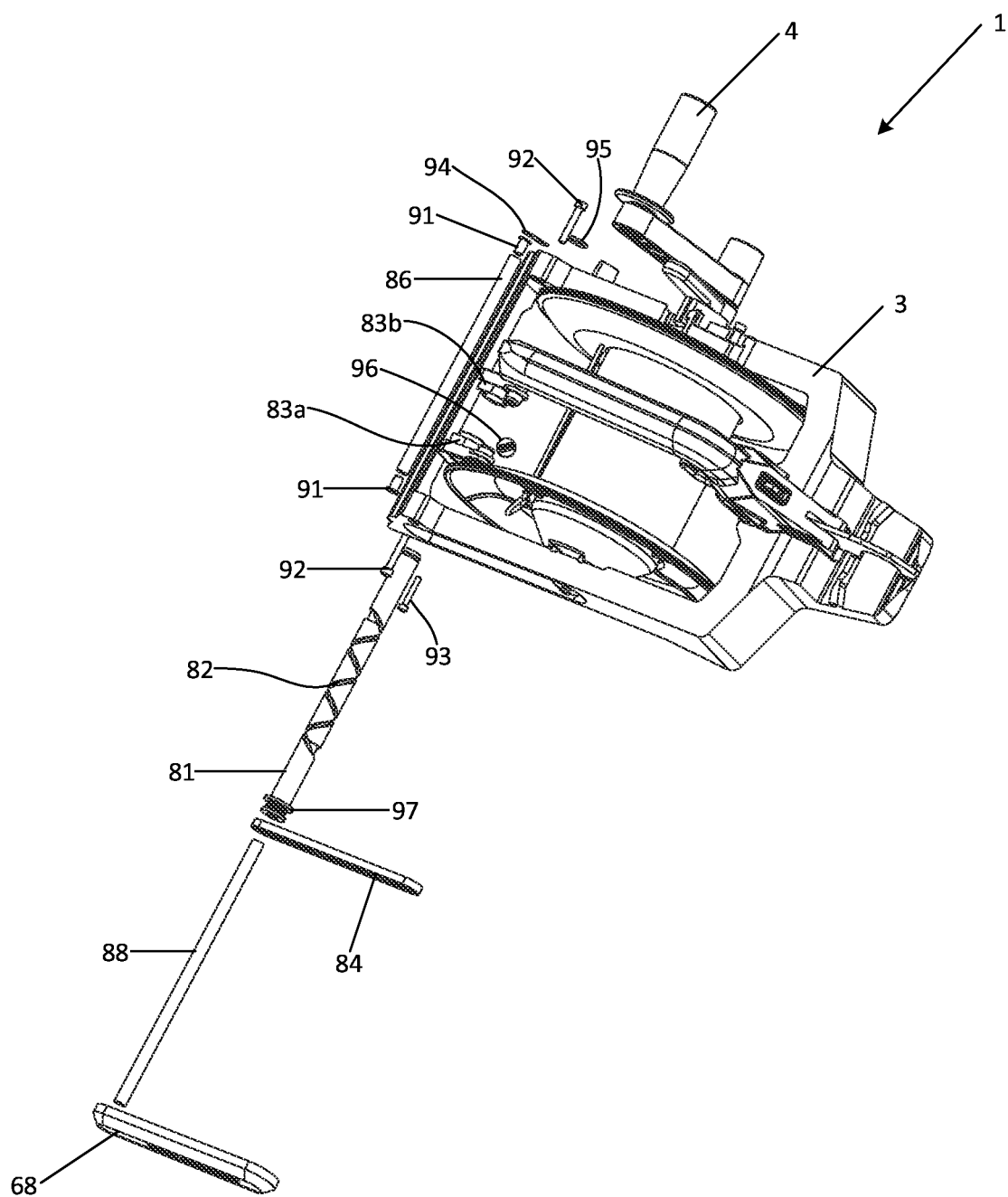
FIG. 8 is another partly exploded view of the reel of FIG. 1.

FIG. 8 is a partly exploded view showing details of the spreader of the reel 1. The spreader includes a spreader shaft 81 that is driven by belt 84. The belt 84 is in turn driven by the pulley 67 which is directly coupled to the crank shaft 61 as shown in FIG. 5. In this example, a cover 68 is also provided over the belt to protect the drive arrangement from debris and protect users from moving parts. The spreader shaft 81 in this example 1 is provided on a reinforcement shaft 88. The reinforcement shaft can be metal. This may allow the spreader shaft 81 to be made of a material like a plastics material which is easier to cut a groove into while retaining good stiffness and strength due to the reinforcement shaft 88.

As the spreader shaft 81 rotates, the shuttle 83 (including shuttle body parts 83a, 83b) is driven by a worm to move back and forth along the shaft. In this example, the worm is double helical groove 82. The shuttle 83 has a follower 96 that projects into the groove 82 so that rotation of the shaft 81 drives the shuttle along the shaft. The shuttle 83 also engages with a rail to prevent rotation of the shuttle 83 around the shaft 81. The conductor can pass through a passage in the shuttle 83 to move back and forth along the shaft 81 as it is reeled in so that it is deposited evenly on the bobbin 2. To reduce friction between the conductor and the shuttle 83, the shuttle 83 can include a roller tube over which the conductor passes. The spreader shaft can be driven with a ratio of crank rotation speed to spreader shaft rotation speed of about 1:1.

The spreader shaft 81 is rotatably mounted to the frame 3 by circular clip 95 at one end of the shaft 81 and shoulder 97 at the other end of the shaft 81. The spreader shaft 81 in this example is made of plastic material and is provided on a metal tube press fit within the plastic outer as reinforcement shaft 88. This construction may produce a high-strength part that is more cost-effective than one incorporating a metal rod as reinforcement shaft 88, and stronger than a fully plastic shaft.

The bar 86 in this example is in the form of a tube. The bar is made of a conductive material such as metal. The bar 86 in this example is rotatable so that it can rotate as the conductor passes over it, which may reduce friction and wear on the conductor. The bar 86 can be arranged so that the conductor wraps partly around it to ensure good contact and electrical continuity by providing a large contact path between the conductor and the bar 86. Smaller diameter bars may require greater degrees of wrapping of the conductor to achieve a sufficiently large contact patch. In one example, the bar 86 has a diameter of approximately 10 mm (approximately 3/8 inch). The conductor can leave the bar at an angle of at least 30°, at least 60°, at least 90°, or about 100° to the angle at which it approaches the bar. Although the bar 86 in this example is in the form of a straight tube with a circular cross section, various forms of bar of different cross sections could be used, as well as bars that are not hollow or not completely straight. The bar 86 in this example is aluminium tube. The low mass and size of the tube reduces the moment of inertia of the bar, therefore increasing its ability to maintain the same surface speed as the conductor passing over it, which may reduce abrasive wear of the conductor.

The bar 86 is rotatably mounted on inserts 91 with smooth external surfaces on which the bar can rotate and threaded inner surfaces (e.g. Avdel "Nutserts"). The inserts 91 are in turn attached to the frame 3 by bolts 92. A conductive piece 94 is connected to bar 86 and to switch 87. The switch 87 is connected to a hot-up wire (item 90 of FIG. 9). The switch is rotatable to make or break electrical conduction between the conductive piece 94 and the hot-up wire.

In another example, a second bar is provided, which can be identical to the first bar apart from its position. The second bar can also be electrified. The second bar is located such that a length of conductor extending from the bobbin can wind around both bars. This may improve electrical contact between the length of conductor and the bars.

Electrifying the conductor at the point where it has left the bobbin 2 may have the advantage of ensuring good electric contact due to the ability to partly wrap the conductor around the bar 86. Having the hot-up contact at the outside of the spooled conductor rather than as detailed later with reference to FIG. 12 means that when current flows through the conductor, for example due to an animal contacting the fence, the current only needs to flow along the unwound length that forms the fence, rather than having to flow through most of the conductor that is wound on the bobbin 2. This may help to maintain a higher voltage present on the unwound wire that forms the fence.

Figure 9:
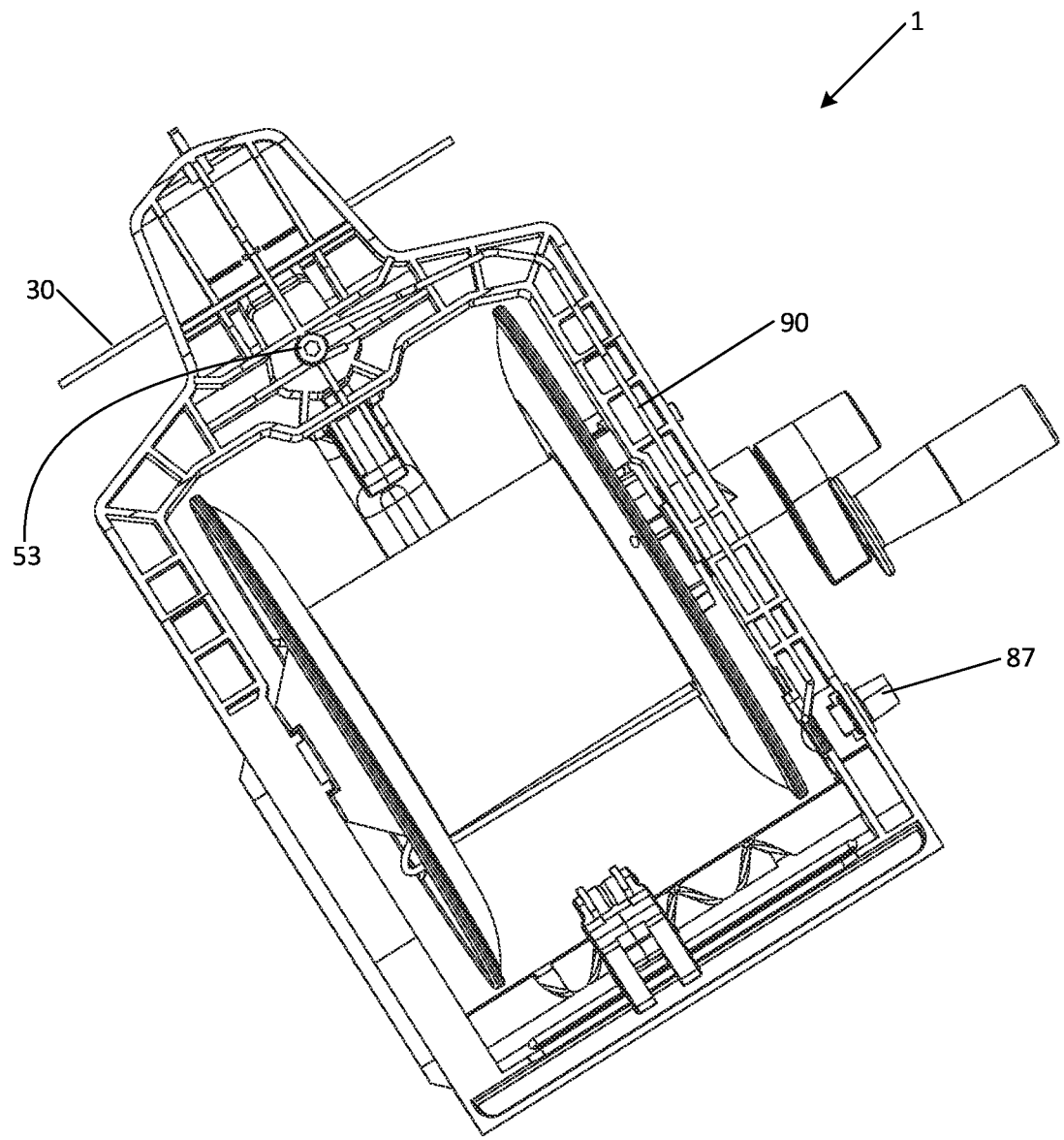
FIG. 9 is a view of the underside of the reel of FIG. 1.

FIG. 9 shows the underside of the reel 1. The reel 1 is shown connected to a wire 30. Provided on the underside of the reel is the bolt 53. As described with reference to FIG. 4, the bolt 53 can be galvanically connected to the electrical contact, which in this example is one of the jaws. Hot-up wire 90 is galvanically connected to the bolt 53 and to the hot-up bar via switch 87. This brings the hot-up bar into electrical contact with the wire 30 in the jaws when the switch 87 is closed. When the wire 30 is an electrified conductor of an electric fence, the conductor of the reel will be electrified due to its contact with the hot-up bar.

Figure 12:
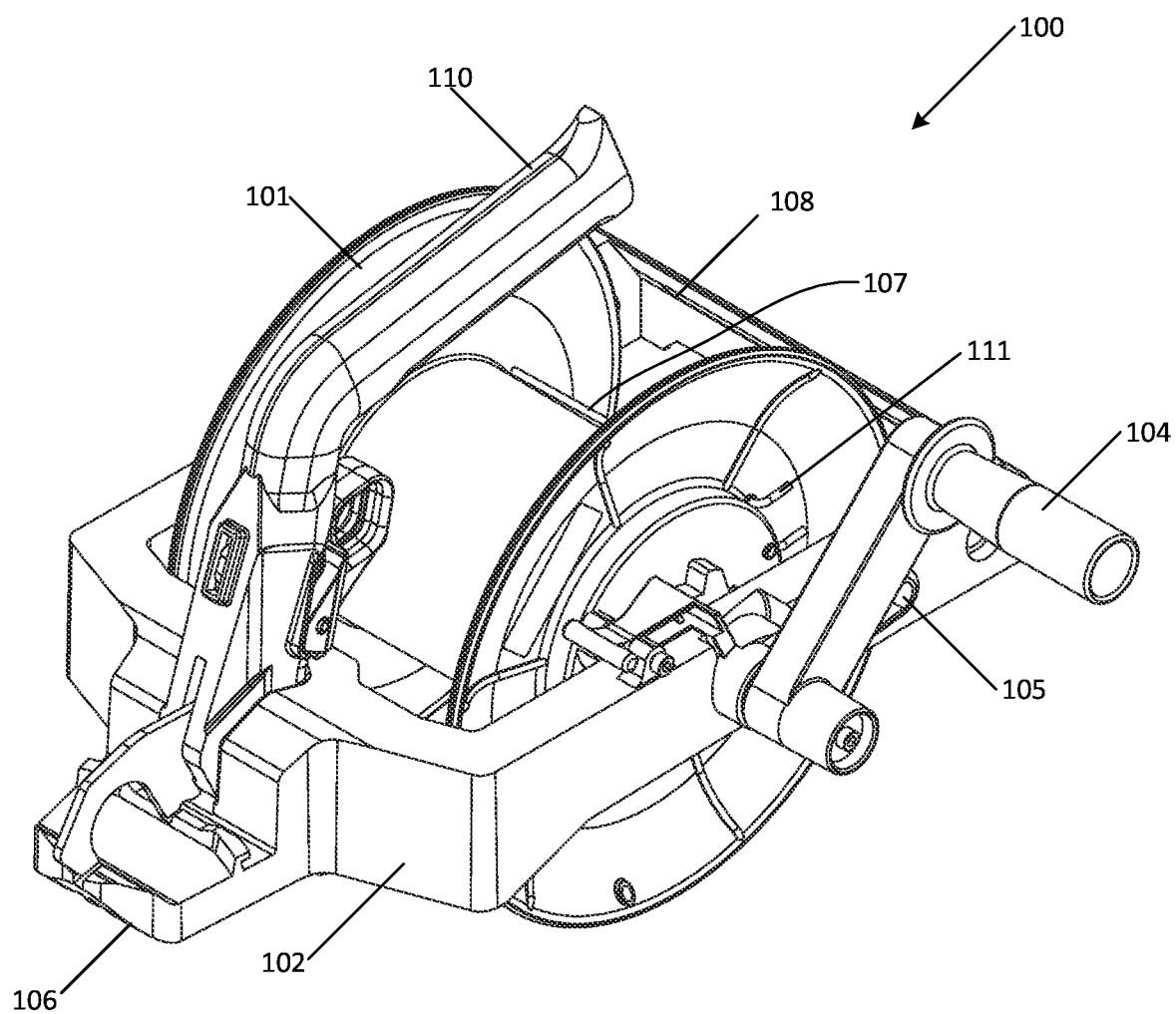
FIG. 12 is a perspective view of a reel in accordance with another example.

FIG. 12 shows an alternative example of the reel 100. In this example, the reel does not include a spreader. Instead, the conductor goes from the bobbin 101 out from the reel 100 via a guide, which is a bar with a slot 108 in it, located at the front of the frame 102. In this example, the reel 100 has a hot-up contact 107 near the spindle of the bobbin 101 on which the conductor is wound. The conductor in this example would be electrified by connecting a power source to an accessible part 111 of the contact 107. The bobbin 101, crank 104, disengagement lever 105, handle 110 and connector 106 are the same as the example of FIG. 1.

Figure 13:
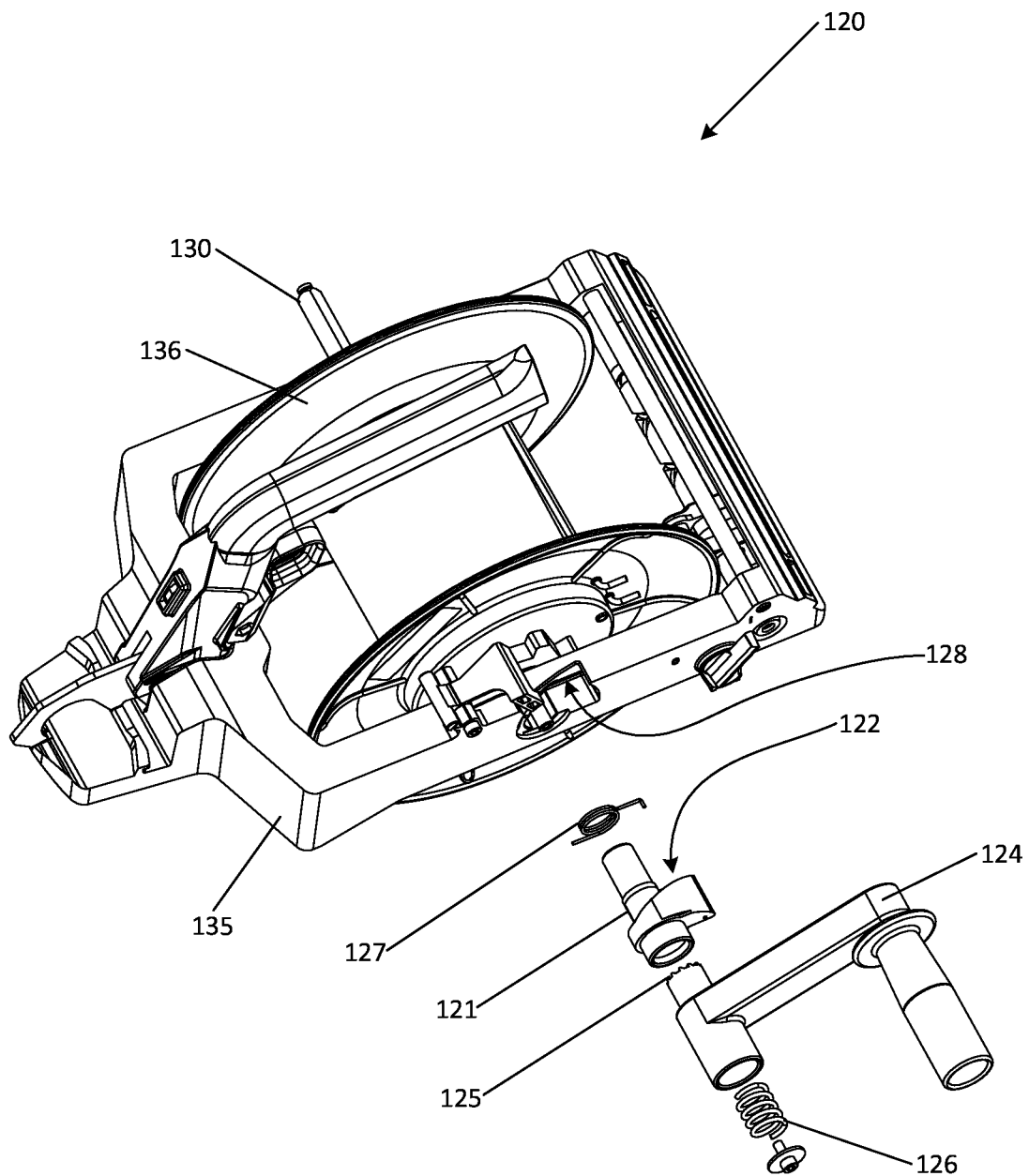
FIG. 13 is a partly exploded view of a reel in accordance with another example.
Figure 14:
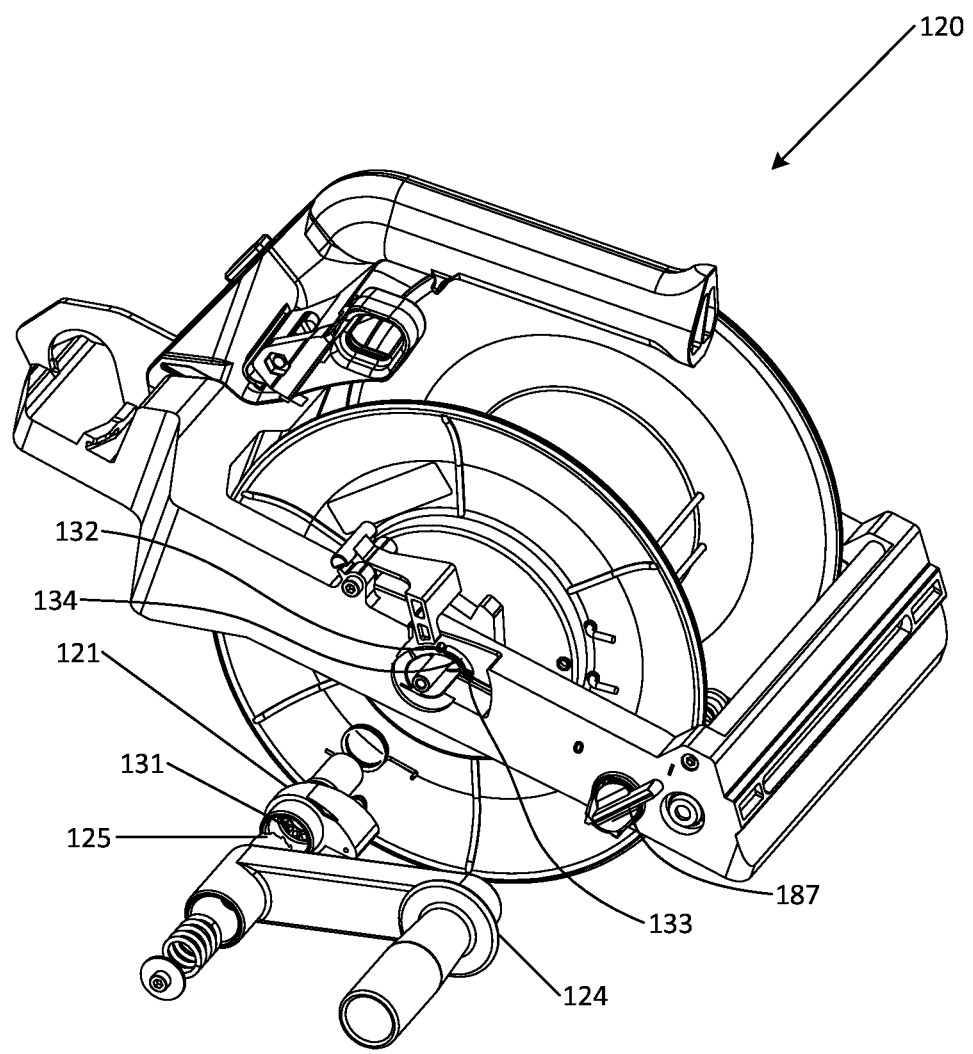
FIG. 14 is another partly exploded view of the reel of FIG. 13.

FIGS. 13 and 14 show an alternative reel 120 in which the disengagement lever is replaced by disengagement bushing 121. In this example, the brake is applied automatically when the bobbin 136 is rotated in the "backwards" direction to pay out the conductor. The crank 124 is also disengaged automatically when the bobbin 136 is rotated backwards.

The reel 120 has a ratcheting interface between the crank 124 and disengagement bushing 121. The ratcheting interface is formed by teeth 125 on the crank 124 and corresponding teeth 131 on the disengagement bushing 121. When the crank 124 is rotated in the "forwards" direction (clockwise in FIGS. 13 and 14) to wind in the conductor, the teeth 125 and 131 can slip past each other and the crank 124 can rotate freely with respect to the disengagement bushing 121. When the crank 124 is rotated in the "backwards" direction (anti-clockwise in FIGS. 13 and 14) to wind out the conductor the teeth 125 and 131 engage. This means that rotation of the crank 124 rotates the disengagement bushing 121. Cam surface 122 on the disengagement bushing 121 rides over cam surface 128 of the frame and causes the disengagement bushing 121 to lift out from the frame 135. When the disengagement bushing is in its outward position the crank is disengaged from the crank shaft 130 and is no longer driven in rotation. The spring 126 is also compressed, which increases the force on the crank shaft 130 and causes the brake to be applied to the bobbin 136 or applied to a greater degree.

In one scenario, the end of the conductor is connected to an existing fence and the reel 120 is attached to a farm bike. The farmer can then ride the bike away from the existing fence to reel out the conductor and form a temporary fence. The conductor will be pulled from the reel 120, which causes the bobbin 136 to rotate in the "backwards" direction. Because the crank 124 is coupled to the bobbin 136 (via shaft 130), the crank 124 will also begin to rotate in the "backwards" direction. This drives rotation of the disengagement bushing 121, disengagement of the crank 124 and application of the brake as described above.

The crank 124 can be re-engaged with the crank shaft 130 by turning the crank 124 in the forwards direction. In the example of FIGS. 13 and 14, a torsion spring 127 is provided between the disengagement bushing 121 and the frame 135. This biases the disengagement bushing 121 into the engagement position so that when the crank 124 is rotated in the forwards direction the disengagement bushing 121 rotates towards the inward engagement position to re-engage the crank 124 with the crank shaft 130.

One or more detents can be provided between the disengagement bushing 121 and the frame 135. These can latch the disengagement bushing 121 in the outward (disengagement) position and/or the inward (engagement position). In the example of FIG. 14, recesses are formed in the frame that receive a protrusion (not shown) of the disengagement bushing 121. In this example, there are two recesses 132, 133 corresponding to stops at the disengagement and engagement positions respectively and a groove 134 between them. As well as providing stops to latch the bushing 121 into the engagement and disengagement positions, these may also provide tactile feedback to the user to indicate engagement and disengagement of the crank 124 and the crank shaft 130.

The reel 120 of FIGS. 13 and 14 also has a switch 187 that has a slightly different design than the switch 87 of FIGS. 1 to 5. The longer handle of the switch 187 can improve leverage to make the switch easier to turn.

FIGS. 15 to 18 show a reel 200 with a modified connector 206. The connector 206 is oriented at about 90° to the connector 6 of FIG. 1 so that its opening is generally towards the bottom of the reel 200, rather than the back of the reel. This may make the reel 200 easier to hook onto a bar or wire because it can be lowered onto the bar or wire instead of being pushed laterally onto it. The connector 206 is also located closer to the main body of the reel 200, which allows for a more compact design.

Figure 16:
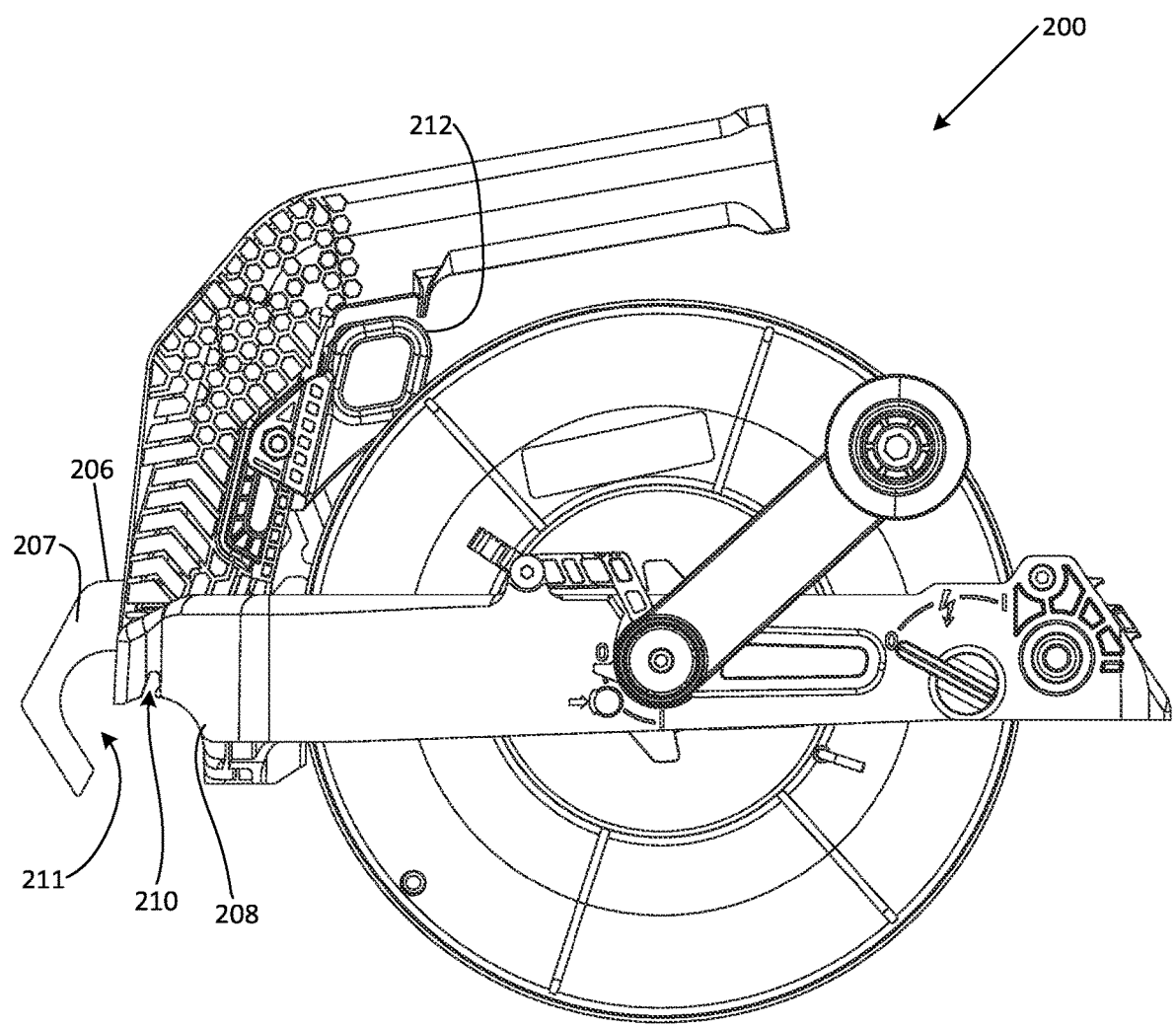
FIG. 16 is a side view of the reel of FIG. 15 in one state.
Figure 17:
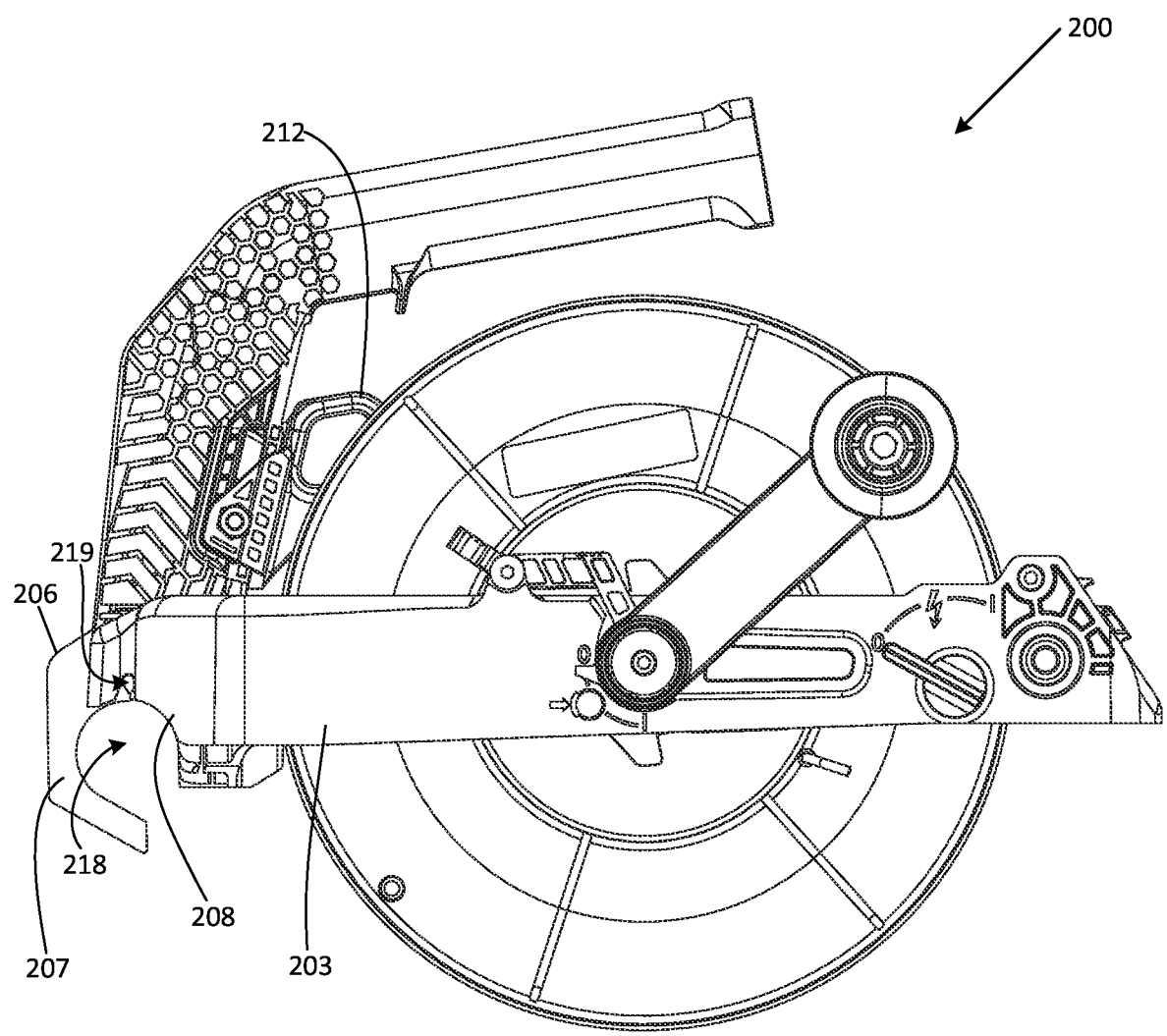
FIG. 17 is a side view of the reel of FIG. 15 in another state.

The connector 206 has passages 218 and 219 defined therethrough. These correspond to the passages 18 and 19 of the reel 1 of FIG. 2 and can have the same dimensions and purposes—for attaching to a tube and a fence wire, respectively. As shown in FIGS. 16 and 17, due to the change in position and orientation the fixed jaw 208 can be formed in the body of the frame 203, rather than extending from it as in FIG. 1.

In FIG. 16, the trigger 212 is pulled back and the connector 206 is open. The jaw 207 has rotated away from the fixed jaw 208. In this state, the reel 200 can be lowered onto a tube or a wire. As with the connector of FIG. 1, the jaw 207 has a recess 211 on its inner side to define part of the passage 218 shown in FIG. 17. There is also a recess 210 formed in the jaw 207 that defines part of the passage 219 shown in FIG. 17.

In FIG. 17, the trigger 212 is in its rest position and the connector 206 is closed. The jaw 207 has rotated back towards the jaw 208. The passages 218 and 219 are provided between the jaws 207 and 208 to retain a tube or a wire, respectively. Although there is a gap between the jaws 207 and 208 around the passage 218, this is configurated to be smaller than a typical tube diameter so will still retain the tube in the passage 218.

Figure 15:
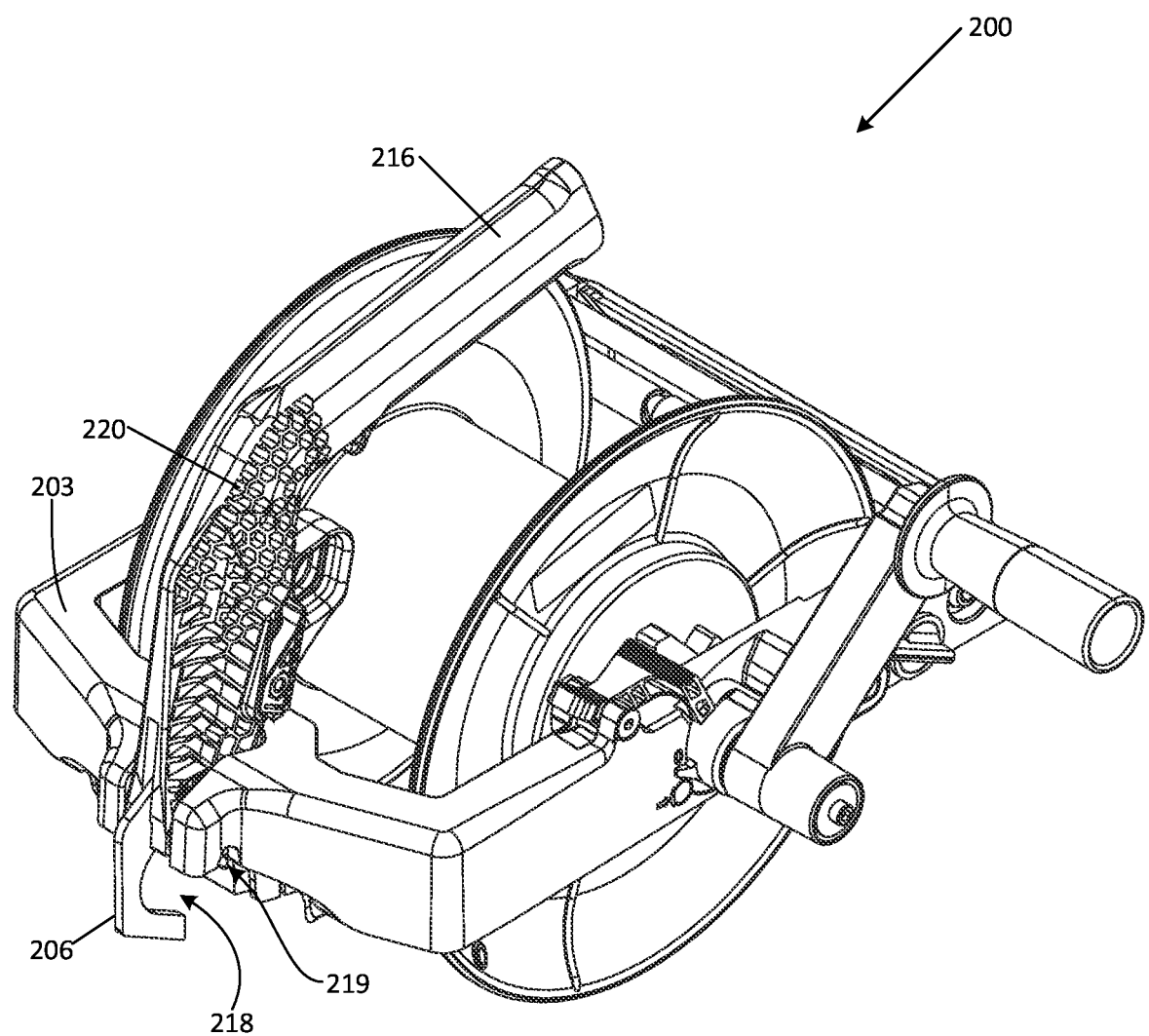
FIG. 15 is a perspective view of a reel in accordance with another example.

Also shown in FIGS. 15 to 17 is a honeycomb pattern 220 formed in the handle 216. This allows the weight of the reel 200 to be kept down while maintaining appropriate strength of the handle.

The partly exploded view of FIG. 18 shows the locking mechanism of the reel 200 in detail. In this example, the member 241 has a guide slot 244. A guide pin 247 is carried on the trigger 212 and passes through the guide slot to guide movement of the member 241 and to lock it in the closed position, similar to the equivalent features of FIG. 4. The member 241 also includes a pivot hole 242 that the pivot pin 245 passes through to pivotably mount the member 241 to the handle 216, similar to the equivalent features of FIG. 4. The pivot pin is retained on the reel by nut 265. The member 241 has a recess 217 that partly defines the passage 219 when the member 214 is in the closed position as shown in FIG. 17. The torsion spring 250 is located above the trigger 212 and mounted in the handle 216. The spring 250 drives the trigger back into the closed, rest position, with member 241 locked in the closed position, when the trigger 212 is released.

As shown in FIG. 18, the shape of the member 241 is different from the equivalent member of FIG. 4. In particular, the portion at the end that forms the jaw 207 is rotated downwards by about 90° to the equivalent part of the member of FIG. 4. This is due to the downward inclination of the connector 206 discussed with reference to FIG. 15. Bolt 253 is also provided to attach the handle 216 to the frame 203.

In the embodiment of FIGS. 15 to 18, the hot-up wire 290 is electrically connected to the member 241, and hence jaw 207, via pivot pin 245. The end of the hot-up wire 290 is hooked over the pivot pin 245, which is in contact with the member 241 about pivot hole 242.

Several embodiments of the reel have been disclosed, with various different implementations of parts of the reel. For example, the different reels have different connectors, different hot-up arrangements, different locking mechanisms and different crank disengagement/brake application arrangements. Like parts of each embodiments can be exchanged with like parts of other embodiments, such that any suitable combination of these parts is within the scope of the disclosure.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The present application discloses the following items.

Item 1: A reel for a conductor of an electric fence, the reel including:
 a bobbin;
 a frame for supporting the bobbin; and
 a connector coupled to the frame for connecting the reel to a support, the connector including two jaws configured for relative movement between open and closed configurations.

Item 2: The reel of item 1, further including a trigger for driving the relative movement of the jaws.

Item 3: The reel of item 1 or item 2, wherein the connector includes a locking mechanism for preventing the jaws, when closed, from being opened by a separating force applied to the jaws.

Item 4: The reel of item 3, wherein the locking mechanism includes:
 a member coupled to one of the jaws, the member having
  a pivot hole and a guide slot;
 a pivot pin extending through the pivot hole; and
 a guide pin extending through the guide slot and movable relative to the guide slot;
the locking mechanism configured such that in one relative position the guide pin and the guide slot interact to prevent pivoting of the member and in another relative position the guide pin and guide slot allow pivoting of the member.

Item 5: The reel of item 3 or item 4, wherein the guide pin is configured to move along the guide slot to drive pivoting of the member and the relative movement of the jaws between open and closed positions.

Item 6: The reel of any one of item 1 to 5, wherein the jaws define a first passage therebetween for receiving a conductor of an existing electric fence.

Item 7: The reel of item 6, wherein the first passage has a width less than approximately 15 mm.

Item 8: The reel of item 6 or item 7, wherein at least one of the jaws has an electrically conductive portion adjacent the first passage to galvanically connect the reel to the conductor of the existing electric fence.

Item 9: The reel of item 8, further including a hot-up contact for electrifying the conductor of the reel when the hot-up contact is galvanically connected to the electrically conductive portion of the at least one of the jaws.

Item 10: The reel of item 9, further including a switch between the hot-up contact and the electrically conductive portion of the at least one of the jaws to selectively galvanically connect and disconnect the hot-up contact and the electrically conductive portion of the at least one of the jaws.

Item 11: The reel of any one of item 6 to 9, wherein the jaws define a second passage therebetween, the second passage having a width greater than that of the first passage.

Item 12: The reel of item 11, wherein the second passage has a width greater than approximately 15 mm.

Item 13: The reel of any one of item 1 to 12, wherein at least one of the jaws has a wide contact region for contacting the support at widely separated points along the support.

Item 14: The reel of item 13, wherein the wide contact region is at least 50 mm wide.

Item 15: A reel for a conductor of an electric fence, the reel including:
 a bobbin;
 a crank for rotating the bobbin, the crank being selectively disengageable from the bobbin; and
 a brake for restricting rotation of the bobbin when applied;
wherein the brake is configured to be applied upon disengagement of the crank.

Item 16: The reel of item 15, further including a crank shaft for coupling the bobbin to the crank, the crank shaft having a cross-sectional shape configured to engage with a corresponding shape of a recess in the crank to transmit rotation between the crank and the crank shaft.

Item 17: The reel of item 16, further including a disengagement member coupled between the bobbin and the crank that is operable to disengage the crank.

Item 18: The reel of item 17, wherein the disengagement member has one or more cam surfaces to move the crank in the axial direction of the crank shaft when the disengagement member is turned to disengage the crank from the bobbin.

Item 19: The reel of item 18, wherein the crank shaft is coupled to a braking element and resiliently coupled to the crank such that when the crank moves in the axial direction a force in the axial direction is applied to the crank shaft, which presses the braking element against the bobbin.

Item 20: The reel of any one of item 17 to 19 wherein the disengagement member is a disengagement lever for manually disengaging the crank.

Item 21: The reel of any one of item 17 to 19 wherein the disengagement member is a disengagement bushing for automatically disengaging the crank.

Item 22: The reel of item 19, wherein the braking element is made at least partly of a natural fibre.

Item 23: The reel of item 22, wherein the natural fibre is wool.

Item 24: The reel of any one of item 15 to 23, further including a ratchet on the bobbin and a pawl configured to engage the ratchet to prevent rotation of the bobbin in one direction when the pawl is engaged.

Item 25: The reel of item 24, when dependent on any one of item 17 to 23, wherein the disengagement member is configured to disengage the pawl from the ratchet when the disengagement member is operated to disengage the crank from the bobbin.

Item 26: The reel of item 25, wherein the disengagement member includes a cam lobe for pushing the pawl away from the ratchet when the disengagement member is operated.

Item 27: A reel for a conductor of an electric fence, the reel including:
  a bobbin;
  a guide configured to guide a length of the conductor that extends from the bobbin;
  an electrical contact for connecting to an electric power supply; and
  a bar galvanically connectable to the electrical contact and positioned between the bobbin and the guide such that the length of conductor can engage the bar to electrify the conductor.

Item 28: The reel of item 27, wherein the bar is rotatable.

Item 29: The reel of item 27 or 28, further including a second bar galvanically connectable to the electrical contact and positioned such that the length of conductor can partly wrap around the second bar.

Item 30: The reel of any one of item 27 to 29, further including a switch for selectively connecting and disconnecting the electrical contact and the bar.

Item 31: The reel of any one of item 27 to 30 further including a connector for connecting the reel to a conductor of an existing electric fence, wherein the electrical contact is on the connector and the electric power supply is the electric power supply of the existing electric fence.

Item 32: A reel for a conductor of an electric fence, the reel including:
  a bobbin; and
  a spreader configured to move the conductor across the bobbin as the bobbin rotates to control distribution of the conductor on the bobbin.

Item 33: The reel of item 32, wherein the spreader includes a spreader shuttle and a spreader shaft, the spreader shuttle including a helical worm that causes the shuttle to move along the spreader shaft when the spreader shaft rotates.

Item 34: The reel of item 33, further including a crank for rotating the bobbin, wherein rotation of the spreader shaft is driven by the crank.

Item 35: The reel of item 34, further comprising a transmission coupled to the crank for rotating the bobbin at a crank-to-bobbin rotation speed ratio of less than 2:3.

Item 36: The reel of item 35, wherein the crank-to-bobbin rotation speed ratio is about 1:3.

Item 37: The reel of item 36, wherein the spreader shaft is driven from the crank at a crank-to-spreader shaft rotation speed ratio of approximately 1:1.

Item 38: The reel of any one of item 33 to 37 wherein the spreader shaft has a plastic outer over a metal inner.

Item 39: The reel of any one of item 32 to 37, further comprising a frame surrounding the bobbin, the spreader being connected to the frame.

Item 40: The reel of item 39, further including a connector for connecting the reel to a support, the connector being connected to the frame.

Item 41: The reel of item 40, wherein the connector is connected to the frame on the opposite side of the bobbin from the spreader.

Item 42: A reel for a conductor of an electric fence, the reel including:
  a bobbin;
  a connector for connecting the reel to a conductor of an existing electric fence to support the reel in use; and
  a plastics material frame coupled to the bobbin and the connector, the frame surrounding the bobbin.

Item 43: The reel of item 42, wherein the frame is a one-piece frame.

Item 44: The reel of item 43, wherein the frame is moulded.

Item 45: A reel for a conductor of an electric fence, the reel including:
  a bobbin;
  a connector for connecting the reel to a conductor of an existing electric fence to support the reel in use; and
  a one-piece frame coupled to the bobbin and the connector, the frame surrounding the bobbin.

Item 46: The reel of item 45, wherein the frame is plastics material.

Item 47: The reel of item 46, wherein the frame is moulded.

Item 48: A reel of a conductor of an electric fence, the reel including:
  a bobbin;
  a hot-up contact configured to contact the conductor to electrify the conductor; and
  a connector for connecting the reel to a support, the connector having an electrical contact thereon for making electrical contact with the support;
wherein the electrical contact of the connector is electrically connected to the hot-up contact to electrify the connector when the reel is connected to the support.

Item 49: A reel for a conductor of an electric fence, the reel including:
  a bobbin;
  a frame for supporting the bobbin; and
  a connector for connecting the reel to another object, the connector including a trigger for moving the connector between open and closed configurations.

Item 50: A reel for a conductor of an electric fence, the reel including:
  a bobbin;
  a frame for supporting the bobbin;
  a connector for connecting the reel to another object, the connector including two jaws configured for relative movement between open and closed configurations; and
  a locking mechanism for selectively preventing the jaws being forced open.

Item 51: A reel for a conductor of an electric fence, the reel including:
  a bobbin;
  a frame for supporting the bobbin; and
  a connector for connecting the reel to another object, the connector including two jaws configured for relative movement between open and closed configurations;
  wherein the two jaws define two passages therebetween, each passage configured to receive an object to be connected to.

Item 52: A reel for a conductor of an electric fence, the reel including:
  a bobbin;
  a frame for supporting the bobbin; and
  a connector for connecting the reel to another object, the connector including two jaws configured for relative movement between open and closed configurations;

wherein at least one of the jaws has a wide contact region for contacting the object at widely separated points along the object.

The invention claimed is:

1. A reel for a conductor of an electric fence, the reel including:
a bobbin;
a crank for rotating the bobbin, the crank being selectively disengageable from the bobbin;
a crank shaft for coupling the bobbin to the crank; and
a brake for restricting rotation of the bobbin when applied;
wherein the brake is configured to be applied upon disengagement of the crank,
wherein the reel includes a braking element that is pressed against the bobbin by the crank shaft to restrict the rotation of the bobbin, and
wherein the braking element is a friction washer.

2. The reel of claim 1, wherein the crank shaft having a cross-sectional shape configured to engage with a corresponding shape of a recess in the crank to transmit rotation between the crank and the crank shaft.

3. The reel of claim 2, further including a disengagement member coupled between the bobbin and the crank that is operable to disengage the crank.

4. The reel of claim 3, wherein the disengagement member is a disengagement lever for manually disengaging the crank.

5. The reel of claim 3, wherein the disengagement member has one or more cam surfaces to move the crank in the axial direction of the crank shaft when the disengagement member is turned to disengage the crank from the bobbin.

6. The reel of claim 5, further comprising a cam surface of a frame of the reel, wherein a cam surface of the disengagement member is configured to ride over the cam surface of the frame to move the disengagement member out from the frame.

7. The reel of claim 2, further including a disengagement member coupled between the bobbin and the crank that is operable to disengage the crank, wherein the disengagement member is a disengagement bushing for automatically disengaging the crank.

8. The reel of claim 7, wherein the brake is configured to be applied and the crank is configured to be disengaged when the bobbin is rotated in a direction corresponding to paying out conductor from the bobbin.

9. The reel of claim 7, wherein the reel includes a ratcheting interface between the crank and the disengagement bushing.

10. The reel of claim 9, wherein the ratcheting interface comprises teeth on the crank and corresponding teeth on bushing.

11. The reel of claim 10, wherein the teeth are configured to engage when the crank is rotated in a direction corresponding to paying out the conductor such that rotation of the crank rotates the disengagement bushing.

12. The reel of claim 1, wherein the crank shaft is coupled to the braking element and resiliently coupled to the crank such that when the crank moves in the axial direction a force in the axial direction is applied to the crank shaft, which presses the braking element against the bobbin.

13. The reel of claim 1, wherein the braking element is made at least partly of a natural fibre.

14. The reel of claim 13, wherein the natural fibre is wool.

15. The reel of claim 1, further including a ratchet on the bobbin and a pawl configured to engage the ratchet to prevent rotation of the bobbin in one direction when the pawl is engaged.

16. The reel of claim 15, wherein the direction in which rotation of the bobbin is prevented is the direction corresponding to paying out of the conductor.

17. The reel of claim 16, wherein the disengagement member is configured to disengage the pawl from the ratchet when the disengagement member is operated to disengage the crank from the bobbin.

18. The reel of claim 17, wherein the disengagement member includes a cam lobe for pushing the pawl away from the ratchet when the disengagement member is operated.

* * * * *